United States Patent
Ma et al.

(10) Patent No.: US 10,187,246 B2
(45) Date of Patent: Jan. 22, 2019

(54) METHOD AND APPARATUS FOR TRANSMISSION MODE CONVERSION

(71) Applicant: Huawei Technologies Co., Ltd., Shenzhen (CN)

(72) Inventors: Jie Ma, Shenzhen (CN); Zhenzhen Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/347,529

(22) Filed: Nov. 9, 2016

(65) Prior Publication Data

US 2017/0063595 A1    Mar. 2, 2017

Related U.S. Application Data

(63) Continuation of application No. PCT/CN2014/077190, filed on May 9, 2014.

(51) Int. Cl.
*H04L 29/08* (2006.01)
*H04W 72/04* (2009.01)
(Continued)

(52) U.S. Cl.
CPC ............... *H04L 29/08* (2013.01); *H04W 4/70* (2018.02); *H04W 72/04* (2013.01); *H04W 88/08* (2013.01)

(58) Field of Classification Search
None
See application file for complete search history.

(56) References Cited

U.S. PATENT DOCUMENTS

| 9,769,644 | B2 * | 9/2017 | He ..................... H04W 72/02 |
| 2009/0180435 | A1 | 7/2009 | Sarkar |

(Continued)

FOREIGN PATENT DOCUMENTS

| CN | 103037450 A | 4/2013 |
| CN | 103763744 A | 4/2014 |

(Continued)

OTHER PUBLICATIONS

"Seamless switching of D2D transmission modes," 3GPP TSG-RAN WG2 #85bis Valencia, Spain, Tdoc R2-141261, pp. 1-4, 3rd Generation Partnership Project, Valbonne, France (Mar. 31-Apr. 4, 2014).

(Continued)

*Primary Examiner* — Kouroush Mohebbi
(74) *Attorney, Agent, or Firm* — Leydig, Voit & Mayer, Ltd.

(57) ABSTRACT

A method and an apparatus for transmission mode conversion are disclosed. The method includes: detecting, by a terminal, whether a first transmission mode for sending data can be used; using, by the terminal, a second transmission mode to send the data when detecting that the first transmission mode cannot be used; stopping, by the terminal, using of the second transmission mode to send the data, and using the first transmission mode to send the data, when detecting that the first transmission mode can be used while the terminal is using the second transmission mode to send the data. By adopting the present disclosure, conversion between different transmission modes can be achieved, thereby avoiding a situation of communications interruption when a current transmission mode cannot be used, and the method is practical.

16 Claims, 19 Drawing Sheets

(51) Int. Cl.
*H04W 4/70* (2018.01)
*H04W 88/08* (2009.01)

(56) References Cited

U.S. PATENT DOCUMENTS

| | | | |
|---|---|---|---|
| 2010/0279672 A1 | 11/2010 | Koskela et al. | |
| 2014/0213221 A1 | 7/2014 | Chai et al. | |
| 2015/0181584 A1 | 6/2015 | Morita et al. | |
| 2015/0264677 A1* | 9/2015 | He | H04W 72/02 370/312 |
| 2017/0086252 A1 | 3/2017 | Chai et al. | |

FOREIGN PATENT DOCUMENTS

| | | |
|---|---|---|
| RU | 2468539 C2 | 11/2012 |
| WO | 2013044864 A1 | 4/2013 |
| WO | 2014003090 A1 | 1/2014 |

OTHER PUBLICATIONS

"Mode Selection and Resource Pool Selection for D2D UEs," 3GPP TSG-RAN WG2 #85bis Valencia, Spain, Tdoc R2-141695, pp. 1-5, 3rd Generation Partnership Project, Valbonne, France (Mar. 31-Apr. 4, 2014).

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.1.0, pp. 1-209, $3^{rd}$ Generation Partnership Project, Valbonne, France (Mar. 2014).

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.1.0, pp. 1-356, $3^{rd}$ Generation Partnership Project, Valbonne, France (Mar. 2014).

"Definitions of coverage states and mode switching for D2D," 3GPP TSG-RAN WG1#76BIS, Shenzhen, China, R1-141452, 3rd Generation Partnership Project, Valbonne, France (Mar. 31-Apr. 4, 2014).

"Determination of in-coverage, out-of-coverage, edge of coverage for D2D UEs," 3GPP TSG-RAN WG1#76bis Shenzhen, China, R1-141559, 3rd Generation Partnership Project, Valbonne, France (Mar. 31-Apr. 4, 2014).

"On resource allocation for D2D communication",3GPP TSG-RAN WG1 Meeting #76bis,Shenzhen, China, R1-141390, 3rd Generation Partnership Project, (Mar. 31-Apr. 4, 2014).

* cited by examiner

METHOD AND APPARATUS FOR TRANSMISSION MODE CONVERSION

CROSS-REFERENCE TO RELATED APPLICATIONS

This application is a continuation of International Application No. PCT/CN2014/077190, filed on May 9, 2014, the disclosure of which is hereby incorporated by reference in its entirety.

TECHNICAL FIELD

The present disclosure relates to the field of network technologies and, in particular, relates to a method and an apparatus for transmission mode conversion.

BACKGROUND

With the development of communications network technologies, changing of a network to which a terminal belongs or changing of a location of the terminal often causes the terminal to be unable to use a current transmission mode for sending data. For example, in a wireless communication network, a device to device (D2D) device performs cellular communications with a base station and sends data through communications resources allocated by the base station, which is the same as a normal terminal device. Actually, the D2D device may be at different positions in a cell of the base station (center or edge of the cell) due to moving of a holder of the D2D device, and sometimes even moves to an area out of wireless network coverage (e.g. a basement). When the D2D device is at the center of the cell, a transmission mode which is to send data using a communications resource allocated by the base station can be used. However, when the D2D device moves to the edge of the cell or an area out of network coverage, since signal power is poor or even there's no wireless signal, the terminal cannot use the transmission mode of sending data by using the communications resource allocated by the base station, i.e. the current transmission mode cannot be used, thus resulting in communications interruption. Therefore, there is no conversion of transmission mode in the prior art, which is unpractical and cannot achieve a conversion to other transmission modes for sending data when the current transmission mode cannot be used.

SUMMARY

Embodiments of the present disclosure provide a method and an apparatus for transmission mode conversion, which can achieve conversion between different transmission modes, thereby avoiding a situation of communications interruption when a current transmission mode cannot be used, and the method is practical.

A first aspect of the present disclosure provides a method for transmission mode conversion, including:

detecting, by a terminal, whether a first transmission mode for sending data can be used;

using, by the terminal, a second transmission mode to send the data when detecting that the first transmission mode cannot be used;

stopping using, by the terminal, the second transmission mode to send the data, and using the first transmission mode to send the data, when detecting that the first transmission mode can be used while the terminal uses the second transmission mode to send the data;

wherein, the first transmission mode refers to that the terminal sends the data through a first communications resource allocated by a base station, and the second transmission mode refers to that the terminal sends data through a second communications resource selected in a resource pool configured by the base station or that the terminal sends data through an inherent third communications resource.

On the basis of the first aspect, in a first practicable implementing manner, the using, by the terminal, a second transmission mode to send the data when detecting that the first transmission mode cannot be used, including:

when the terminal cannot acquire the first communications resource from the base station, determining, by the terminal, that the first transmission mode cannot be used, and using the second transmission mode to send the data; or, when the first communications resource acquired by the terminal from the base station cannot be used, determining, by the terminal, that the first transmission mode cannot be used, and using the second transmission mode to send the data.

On the basis of the first aspect, in a second practicable implementing manner, before using, by the terminal, the second transmission mode to send the data, further including:

detecting, by the terminal, whether the terminal is within network coverage of the base station, when detecting that the first transmission mode cannot be used;

acquiring, by the terminal, the inherent third communications resource, if the terminal is not within the network coverage of the base station.

where the using, by the terminal, a second transmission mode to send the data, comprises:

using, by the terminal, the second transmission mode to send the data through the third communications resource.

On the basis of the second practicable implementing manner of the first aspect, in a third practicable implementing manner, the method further includes:

if the terminal is within the network coverage of the base station, judging, by the terminal, whether a using condition of the second communications resource is satisfied, and when the terminal satisfies the using condition of the second communications resource, selecting the second communications resource in the resource pool pre-allocated by the base station;

wherein the using, by the terminal, a second transmission mode to send the data, comprises:

using, by the terminal, the second transmission mode to send the data through the second communications resource;

wherein the using condition of the second communications resource includes at least one of following conditions:

downlink receiving power of the terminal is lower than a preset threshold;

the base station pre-allocates the resource pool for the terminal.

On the basis of the first practicable implementing manner of the first aspect, in a fourth practicable implementing manner, before detecting, by a terminal, whether a first transmission mode for sending data can be used, further including:

establishing, by the terminal, a wireless connection with the base station, acquiring the first communications resource allocated by the base station, and using the first transmission mode to send the data through the first communications resource;

wherein when the first communications resource acquired by the terminal from the base station cannot be used, determining, by the terminal, that the first transmission mode cannot be used, and using the second transmission mode to send the data, comprises:

when detecting that the wireless connection fails, determining, by the terminal, that the first transmission mode cannot be used, and stopping using the first transmission mode to send the data, and using the second transmission mode to send the data; or, when detecting that the wireless connection fails, determining, by the terminal, that the first transmission mode cannot be used, and stopping using the first transmission mode to send the data, and using the second transmission mode to send the data after a first preset time.

On the basis of the fourth practicable implementing manner of the first aspect, in a fifth practicable implementing manner, the stopping using, by the terminal, the second transmission mode to send the data, and using the first transmission mode to send the data, when detecting that the first transmission mode can be used while the terminal uses the second transmission mode to send the data, includes:

performing, by the terminal, wireless connection reestablishment with the base station while the terminal uses the second transmission mode to send the data;

when the wireless connection reestablishment is successful, determining, by the terminal, that the first transmission mode can be used;

stopping using, by the terminal, the second transmission mode to send the data, and using the first transmission mode to send the data.

On the basis of the first practicable implementing manner of the first aspect, in a sixth practicable implementing manner, the detecting, by a terminal, whether a first transmission mode for sending data can be used, includes:

sending, by the terminal, a connection establishment request to the base station where the connection establishment request is used to establish a wireless connection;

where, when the terminal cannot acquire the first communications resource from the base station, determining, by the terminal, that the first transmission mode cannot be used, and using the second transmission mode to send the data, includes:

when detecting that the base station returns a reject message rejecting establishment of a wireless connection, and the reject message carries a wait time, comparing, by the terminal, the wait time and a second preset time;

if the wait time is larger than the second preset time, determining, by the terminal, that the first transmission mode cannot be used, and using the second transmission mode to send the data after the second preset time.

On the basis of the first practicable implementing manner of the first aspect, in a seventh practicable implementing manner, before detecting, by a terminal, whether a first transmission mode for sending data can be used, further including:

establishing, by the terminal, a wireless connection with the base station, acquiring the first communications resource allocated by the base station, and using the first transmission mode to send the data through the first communications resource;

where, the when the first communications resource acquired by the terminal from the base station cannot be used, determining that the first transmission mode cannot be used, and using the second transmission mode to send the data, includes:

when receiving a resource release message sent from the base station, and the resource release message includes a wait time, comparing, by the terminal, the wait time and a third preset time;

if the wait time is larger than the third preset time, determining, by the terminal, that the first transmission mode cannot be used, and using the second transmission mode to send the data after the third preset time.

On the basis of the sixth practicable implementing manner of the first aspect or the seventh practicable implementing manner of the first aspect, in a eighth practicable implementing manner, the stopping using, by the terminal, the second transmission mode to send the data, and using the first transmission mode to send the data, when detecting that the first transmission mode can be used while the terminal uses the second transmission mode to send the data, includes:

detecting, by the terminal, whether the wait time expires while the terminal uses the second transmission mode to send the data;

when detecting that the wait time expires, stopping using, by the terminal, the second transmission mode to send the data, and using the first transmission mode to send the data.

On the basis of the first practicable implementing manner of the first aspect, in a ninth practicable implementing manner, the detecting, by a terminal, whether a first transmission mode for sending data can be used, includes:

establishing a wireless connection with the base station, and sending a scheduling request to the base station, where the scheduling request is used to request allocation of a cellular uplink resource;

where, when the terminal cannot acquire the first communications resource from the base station, determining by the terminal that the first transmission mode cannot be used, and using the second transmission mode to send the data, includes:

when a number of transmission times of the scheduling request exceeds a preset number of times, and the base station does not allocate the cellular uplink resource, determining, by the terminal, that the first transmission mode cannot be used, and using the second transmission mode to send the data.

On the basis of the ninth practicable implementing manner of the first aspect, in a tenth practicable implementing manner, the stopping using, by the terminal, the second transmission mode to send the data, and using the first transmission mode to send the data, when detecting that the first transmission mode can be used while the terminal uses the second transmission mode to send the data, including:

detecting, by the terminal, whether the base station allocates the cellular uplink resource for the terminal through reconfiguration while the terminal uses the second transmission mode to send the data;

when detecting that the base station allocates the cellular uplink resource for the terminal through the reconfiguration, stopping using, by the terminal, the second transmission mode to send the data, and using the first transmission mode to send the data.

On the basis of the first practicable implementing manner of the first aspect, in a eleventh practicable implementing manner, when the terminal camps on a target cell and locates at an edge of the target cell, where the target cell belongs to the base station, the detecting, by a terminal, whether a first transmission mode for sending data can be used, comprises:

sending, by the terminal, a connection establishment request to the base station, where the connection establishment request is used to establish a wireless connection;

the when the terminal cannot acquire the first communications resource from the base station, determining, by the terminal, that the first transmission mode cannot be used, and using the second transmission mode to send the data, including:

when a number of transmission times of the connection establishment request exceeds a preset number of times, and no response message sent by the base station is received, determining, by the terminal, that the first transmission mode cannot be used, and using the second transmission mode to send the data.

On the basis of the eleventh practicable implementing manner of the first aspect, in a twelfth practicable implementing manner, the stopping using, by the terminal, the second transmission mode to send the data, and using the first transmission mode to send the data, when detecting that the first transmission mode can be used while the terminal uses the second transmission mode to send the data, including:

continuing sending, by the terminal, the connection establishment request to the base station while the terminal uses the second transmission mode to send the data;

when the wireless connection is established successfully, and the base station allocates the first communications resource for the terminal, determining, by the terminal, that the first transmission mode can be used;

stopping using, by the terminal, the second transmission mode to send the data, and using the first transmission mode to send the data.

On the basis of the first aspect or the first practicable implementing manner of the first aspect, the second practicable implementing manner of the first aspect, the third practicable implementing manner of the first aspect, the fourth practicable implementing manner of the first aspect, the fifth practicable implementing manner of the first aspect, the sixth practicable implementing manner of the first aspect, the seventh practicable implementing manner of the first aspect, the eighth practicable implementing manner of the first aspect, the ninth practicable implementing manner of the first aspect, the tenth practicable implementing manner of the first aspect, the eleventh practicable implementing manner of the first aspect, the twelfth practicable implementing manner of the first aspect, in a thirteenth practicable implementing manner, before detecting, by a terminal, whether a first transmission mode for sending data can be used, further including:

performing, by the terminal, cell selection;

when detecting that the terminal camps on a target cell, acquiring, by the terminal, a broadcast message sent by the base station, where the broadcast message includes a selecting condition used to instruct the terminal to perform transmission mode selection, and where the target cell belongs to the base station;

when the selecting condition satisfies a selecting condition of the first transmission mode, establishing, by the terminal, a wireless connection with the base station, acquiring the first communications resource allocated by the base station, and using the first transmission mode to send the data.

On the basis of the thirteenth practicable implementing manner of the first aspect, in a fourteenth practicable implementing manner, the method further includes:

when the selecting condition satisfies a selecting condition of the second transmission mode, using, by the terminal, the second transmission mode to send the data.

On the basis of the thirteenth practicable implementing manner of the first aspect, in a fifteenth practicable implementing manner, the selecting condition of the first transmission mode includes any one of the following conditions:

the resource pool is not notified in the selecting condition;

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, the downlink receiving power is larger than the threshold of the downlink receiving power;

the resource pool is notified in the selecting condition, and the selecting condition includes a load threshold of the resource pool, the resource pool includes at least one second communications resource, a number of an occupied second communications resource in the resource pool exceeds the load threshold.

On the basis of the fourteenth practicable implementing manner of the first aspect, in a sixteenth practicable implementing manner, the selecting condition of the second transmission mode includes any one of the following conditions:

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, the downlink receiving power is smaller than the threshold of the downlink receiving power;

the resource pool is notified in the selecting condition, and the selecting condition includes a load threshold of the resource pool, the resource pool includes at least one second communications resource, the number of an occupied second communications resource in the resource pool is smaller than the load threshold.

A second aspect of the present disclosure provides an apparatus for transmission mode conversion, including: a first detecting module, configured to detect whether a first transmission mode for sending data can be used;

a first sending module, configured to use a second transmission mode to send the data when detecting that the first transmission mode cannot be used;

a second sending module, configured to, when it is detected that the first transmission mode can be used while the second transmission mode is used to send the data, stop using the second transmission mode to send the data and use the first transmission mode to send the data;

where, the first transmission mode refers to that the apparatus sends the data through a first communications resource allocated by the base station to send the data, and the second transmission mode refers to that the apparatus sends data through a second communications resource selected in a resource pool configured by the base station to send the data or the apparatus sends the data through an inherent third communications resource to send the data.

On the basis of the second aspect, in a first practicable implementing manner, the first sending module is specifically configured to, when the first communications resource cannot be acquired from the base station, determine that the first transmission mode cannot be used, and use the second transmission mode to send the data; or, the first sending module is specifically configured to, when the first communications resource acquired from the base station cannot be used, determine that the first transmission mode cannot be used, and use the second transmission mode to send the data.

On the basis of the second aspect, in a first practicable implementing manner, the apparatus further includes:

a second detecting module, configured to, when it is detected that the first transmission mode cannot be used, detect whether the apparatus is within network coverage of the base station;

a first acquiring module, configured to, if the apparatus is not within the network coverage of the base station, acquire the inherent third communications resource of the apparatus;

the first sending module is specifically configured to use the second transmission mode to send the data through the third communications resource.

On the basis of the second practicable implementing manner of the second aspect, in a third practicable implementing manner, the apparatus further includes:

a selecting and judging module, configured to, if the apparatus is within the network coverage of the base station, judge whether a using condition of the second communications resource is satisfied, and when the using condition of the second communications resource is satisfied, select the second communications resource in the resource pool pre-allocated by the base station;

the first sending module is specifically configured to use the second transmission mode to send the data through the second communications resource;

where the using condition of the second transmission mode includes at least one of the following conditions:

downlink receiving power of the apparatus is lower than a preset threshold;

the base station pre-allocates the resource pool for the apparatus.

On the basis of the first practicable implementing manner of the second aspect, in a fourth practicable implementing manner, the apparatus further includes:

a first connection establishing module, configured to establish a wireless connection with the base station, acquire the first communications resource allocated by the base station, and use the first transmission mode to send the data through the first communications resource;

the first sending module is specifically configured to, when it is detected that the wireless connection fails, determine that the first transmission mode cannot be used, and stop using the first transmission mode to send the data, and use the second transmission mode to send the data; or, the first sending module is specifically configured to, when it is detected that the wireless connection fails, determine that the first transmission mode cannot be used, and stop using the first transmission mode to send the data, and use the second transmission mode to send the data after a first preset time.

On the basis of the fourth practicable implementing manner of the second aspect, in a fifth practicable implementing manner, the second sending module further includes:

a reestablishing unit, configured to perform wireless connection reestablishment with the base station while the apparatus uses the second transmission mode to send the data;

a first determining unit, configured to, when the wireless connection reestablishment is successful, determine that the first transmission mode can be used;

a first sending unit, configured to stop using the second transmission mode to send the data, and use the first transmission mode to send the data.

On the basis of the first practicable implementing manner of the second aspect, in a sixth practicable implementing manner, the first detecting module is specifically configured to send a connection establishment request to the base station where the connection establishment request is used to establish a wireless connection;

the first sending module comprises:

a first comparing unit, configured to, when it is detected that the base station returns a reject message rejecting establishment of a wireless connection, and the reject message carries a wait time, compare the wait time and a second preset time;

a second sending unit, configured to, if the wait time is larger than the second preset time, determine that the first transmission mode cannot be used, and use the second transmission mode to send the data after the second preset time.

On the basis of the first practicable implementing manner of the second aspect, in a seventh practicable implementing manner, the apparatus further includes:

a second connection establishing module, configured to establish a wireless connection with the base station, acquire the first communications resource allocated by the base station, and use the first transmission mode to send the data through the first communications resource;

the first sending module comprises:

a second comparing unit, configured to, when a resource release message sent from the base station is received, and the resource release message includes the wait time, compare the wait time and a third preset time;

a third sending unit, configured to, if the wait time is larger than the third preset time, determine that the first transmission mode cannot be used, and use the second transmission mode to send the data after the third preset time.

On the basis of the sixth implementing manner of the second aspect or seventh practicable implementing manner of the second aspect, in a eighth practicable implementing manner, the second sending module includes:

a first detecting unit, configured to detect whether the wait time expires while the apparatus uses the second transmission mode to send the data;

a fourth sending unit, configured to, when it is detected that the wait time expires, stop using the second transmission mode to send the data, and use the first transmission mode to send the data.

On the basis of the first practicable implementing manner of the second aspect in a ninth practicable implementing manner, the first detecting module is specifically configured to establish a wireless connection with the base station, and send a scheduling request to the base station where the scheduling request is used to request allocation of a cellular uplink resource;

the first sending module is specifically configured to, when a number of transmission times of the scheduling request exceeds a preset number of times, and the base station does not allocate the cellular uplink resource, determine that the first transmission mode cannot be used, and use the second transmission mode to send the data.

On the basis of the ninth practicable implementing manner of the second aspect, in a tenth practicable implementing manner, the second sending module further includes:

a second detecting unit, configured to, while the apparatus uses the second transmission mode to send the data, detect whether the base station allocates the cellular uplink resource for the terminal through reconfiguration;

a fifth sending unit, configured to, when it is detected that the base station allocates the cellular uplink resource for the apparatus through the reconfiguration, stop using the second transmission mode to send the data, and use the first transmission mode to send the data.

On the basis of the first practicable implementing manner of the second aspect, in a eleventh practicable implementing manner, when the terminal camps on a target cell and locates at an edge of the target cell, where the target cell belongs to the base station, the first detecting module is specifically configured to send a connection establishment request to the base station where the connection establishment request is used to establish a wireless connection;

the first sending module is specifically configured to, when a number of transmission times of the connection establishment request exceeds a preset number of times, and no response message sent by the base station is received, determine that the first transmission mode cannot be used, and use the second transmission mode to send the data.

On the basis of the eleventh practicable implementing manner of the second aspect, in a twelfth practicable implementing manner, the second sending module further includes:

a sixth sending unit, configured to continue sending the wireless connection request to the base station while the apparatus uses the second transmission mode to send the data;

a second determining unit, configured to, when the wireless connection is established successfully, and the base station allocates the first communications resource for the terminal, determine that the first transmission mode can be used;

a seventh sending unit, configured to stop using the second transmission mode to send the data, and use the first transmission mode to send the data.

On the basis of the second aspect or the first practicable implementing manner of the second aspect, the second practicable implementing manner of the second aspect, the third practicable implementing manner of the second aspect, the fourth practicable implementing manner of the second aspect, the fifth practicable implementing manner of the second aspect, the sixth practicable implementing manner of the second aspect, the seventh practicable implementing manner of the second aspect, the eighth practicable implementing manner of the second aspect, the ninth practicable implementing manner of the second aspect, the tenth practicable implementing manner of the second aspect, the eleventh practicable implementing manner of the second aspect, or the twelfth practicable implementing manner of the second aspect, in a thirteenth practicable implementing manner, the apparatus further includes:

a cell selecting module, configured to perform cell selection;

a second acquiring module, configured to, when it is detected that the terminal camps on a target cell, acquire a broadcast message sent by the base station, where the broadcast message includes a selecting condition used to instruct the apparatus to perform transmission mode selection, and where the target cell belongs to the base station;

a third sending module, configured to, when the selecting condition satisfies a selecting condition of the first transmission mode, establish a wireless connection with the base station, and acquire the first communications resource allocated by the base station, and use the first transmission mode to send the data.

On the basis of the thirteenth practicable implementing manner of the second aspect, in a fourteenth practicable implementing manner, the apparatus further includes:

a fourth sending module, configured to, when the selecting condition satisfies a selecting condition of the second transmission mode, use the second transmission mode to send the data.

On the basis of the thirteenth practicable implementing manner of the second aspect, in a fifteenth practicable implementing manner, the selecting condition of the first transmission mode includes any one of the following conditions:

the resource pool is not notified in the selecting condition;

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, and the downlink receiving power is larger than the threshold of the downlink receiving power;

the resource pool is notified in the selecting condition, and the selecting condition includes a load threshold of the resource pool, the resource pool includes at least one second communications resource, and the number of an occupied second communications resource in the resource pool exceeds beyond the load threshold.

On the basis of the fourteenth practicable implementing manner of the second aspect, in a sixteenth practicable implementing manner, the selecting condition of the second transmission mode includes any one of the following conditions:

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, and the downlink receiving power is smaller than the threshold of the downlink receiving power;

the resource pool is notified in the selecting condition, and the selecting condition includes a load threshold of the resource pool, the resource pool includes at least one second communications resource, and the number of an occupied second communications resource in the resource pool is smaller than the load threshold.

A third aspect of the present disclosure provides an apparatus for mode conversion, which can include: a processor and a transmitter;

the processor is configured to detect whether a first transmission mode for sending data can be used;

the transmitter is configured to use a second transmission mode to send the data when it is detected that the first transmission mode cannot be used;

the transmitter is further configured to, when it is detected that the first transmission mode can be used while using the second transmission mode to send the data, stop using the second transmission mode to send the data and use the first transmission mode to send the data;

where the first transmission mode refers to that the apparatus sends the data through a first communications resource allocated by the base station, the second transmission mode refers to that the apparatus sends the data through a second communications resource selected in a resource pool configured by the base station or the apparatus sends the data through an inherent third communications resource On the basis of the third aspect, in a first practicable implementing manner, the transmitter is further configured to, when the first communications resource cannot be acquired from the base station, determine that the first transmission mode cannot be used, and use the second transmission mode to send the data; or, the transmitter is further configured to, when the first communications resource acquired from the base station cannot be used, determine that the first transmission mode cannot be used, and use the second transmission mode to send the data.

On the basis of the third aspect, in a second practicable implementing manner, the processor is further configured to, when it is detected that the first transmission mode cannot be used, detect whether the apparatus is within network coverage of the base station;

the processor is further configured to, if the apparatus is not within the network coverage of the base station, acquire the inherent third communications resource of the apparatus;

the transmitter is further configured to use the second transmission mode to send the data through the third communications resource.

On the basis of the second practicable implementing manner of the third aspect, in a third practicable implementing manner, the processor is further configured to, if the apparatus is within the network coverage of the base station, judge whether a using condition of the second communications resource is satisfied, and when the using condition of the second communications resource is satisfied, select the second communications resource in the resource pool pre-allocated by the base station;

the transmitter is further configured to use the second transmission mode to send the data through the second communications resource;

where the using condition of the second transmission mode includes at least one of the following conditions:

downlink receiving power of the apparatus is lower than a preset threshold;

the base station pre-allocates the resource pool for the apparatus.

On the basis of the first practicable implementing manner of the third aspect, in a fourth practicable implementing manner, the transmitter is further configured to establish a wireless connection with the base station, acquire the first communications resource allocated by the base station, and use the first transmission mode to send the data through the first communications resource;

the transmitter is further configured to, when it is detected that the wireless connection fails, determine that the first transmission mode cannot be used, stop using the first transmission mode to send the data, and use the second transmission mode to send the data; or, the transmitter is further configured to, when it is detected that the wireless connection fails, determine that the first transmission mode cannot be used, stop using the first transmission mode to send the data, and use the second transmission mode to send the data after a first preset time.

On the basis of the fourth practicable implementing manner of the third aspect, in a fifth practicable implementing manner, the processor is further configured to perform wireless connection reestablishment with the base station while the apparatus uses the second transmission mode to send the data;

the processor is further configured to, when the wireless connection reestablishment is successful, determine that the first transmission mode can be used;

the transmitter is further configured to stop using the second transmission mode to send the data, and use the first transmission mode to send the data.

On the basis of the first practicable implementing manner of the third aspect, in a sixth practicable implementing manner, the transmitter is further configured to send a connection establishment request to the base station where the connection establishment request is used to establish a wireless connection;

the processor is further configured to, when it is detected that the base station returns a reject message rejecting establishment of the wireless connection, and the reject message carries a wait time, compare the wait time and a second preset time;

the transmitter is further configured to, if the wait time is larger than the second preset time, determine that the first transmission mode cannot be used, and use the second transmission mode to send the data after the second preset time.

On the basis of the first practicable implementing manner of the third aspect, in a seventh practicable implementing manner, the transmitter is further configured to establish a wireless connection with the base station, acquire the first communications resource allocated by the base station, and use the first transmission mode to send the data through the first communications resource;

The processor is further configured to, when a resource release message sent from the base station is received, and the resource release message includes the wait time, compare the wait time and a third preset time;

the transmitter is further configured to, if the wait time is larger than the third preset time, determine that the first transmission mode cannot be used and use the second transmission mode to send the data after the third preset time.

On the basis of the sixth practicable implementing manner of the third aspect or seventh practicable implementing manner of the third aspect, in a eighth practicable implementing manner, the processor is further configured to detect whether the wait time expires while the apparatus uses the second transmission mode to send the data;

the transmitter is further configured to, when it is detected that the wait time expires, stop using the second transmission mode to send the data, and use the first transmission mode to send the data.

On the basis of the first practicable implementing manner of the third aspect in a ninth practicable implementing manner, the transmitter is further configured to establish a wireless connection with the base station, and send a scheduling request to the base station there the scheduling request is used to request allocation of a cellular uplink resource;

the transmitter is further configured to, when a number of transmission times of the scheduling request exceeds a preset number of times, and the base station does not allocate the cellular uplink resource, determine that the first transmission mode cannot be used, and use the second transmission mode to send the data.

On the basis of the ninth practicable implementing manner of the third aspect, in a tenth practicable implementing manner, the processor is further configured to, while the apparatus uses the second transmission mode to send the data, detect whether the base station allocates the cellular uplink resource for the terminal through reconfiguration;

the transmitter is further configured to, when it is detected that the base station allocates the cellular uplink resource for the apparatus through the reconfiguration, stop using the second transmission mode to send the data, and use the first transmission mode to send the data.

On the basis of the first practicable implementing manner of the third aspect, in a eleventh practicable implementing manner, when the terminal camps on a target cell and locates at an edge of the target cell, where the target cell belongs to base station, the transmitter is further configured to send a connection establishment request to the base station where the connection establishment request is used to establishing a wireless connection;

the transmitter is further configured to, when a number of transmission times of the connection establishment request exceeds a preset number of times, and no response message sent by the base station is received, determine that the first transmission mode cannot be used, and use the second transmission mode to send the data.

On the basis of the eleventh practicable implementing manner of the third aspect, in a twelfth practicable implementing manner, the transmitter is further configured to continue sending the wireless connection request to the base station while the apparatus uses the second transmission mode to send the data;

the processor is further configured to, when the wireless connection is established successfully, and the base station allocates the first communications resource for the terminal, determine that the first transmission mode can be used;

the transmitter is further configured to stop using the second transmission mode to send the data, and use the first transmission mode to send the data.

On the basis of the third aspect or the first practicable implementing manner of the third aspect, or the second practicable implementing manner of the third aspect, or the third practicable implementing manner of the third aspect, or the fourth practicable implementing manner of the third aspect, or the fifth practicable implementing manner of the third aspect, or the sixth practicable implementing manner of the third aspect, or the seventh practicable implementing manner of the third aspect, or the eighth practicable implementing manner of the third aspect, or the ninth practicable implementing manner of the third aspect, or the tenth practicable implementing manner of the third aspect, or the eleventh practicable implementing manner of the third aspect, or the twelfth practicable implementing manner of the third aspect, in a thirteenth practicable implementing manner, the apparatus further includes a receiver;

the processor is further configured to perform cell selection.

the receiver is further configured to, when it is detected that the terminal camps on a target cell, acquire a broadcast message sent by the base station, where the broadcast message includes a selecting condition used to instruct the apparatus to perform transmission mode selection, and where the target cell belongs to the base station;

the transmitter is further configured to, when the selecting condition satisfies a selecting condition of the first transmission mode, establish a wireless connection with the base station, acquire the first communications resource allocated by the base station, and use the first transmission mode to send the data.

On the basis of the thirteenth practicable implementing manner of the third aspect, in a fourteenth practicable implementing manner, the transmitter is further configured to, when the selecting condition satisfies a selecting condition of the second transmission mode, use the second transmission mode to send the data.

On the basis of the thirteenth practicable implementing manner of the third aspect, in a fifteenth practicable implementing manner, the selecting condition of the first transmission mode includes any one of the following conditions:

the resource pool is not notified in the selecting condition;

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, and the downlink receiving power is larger than the threshold of the downlink receiving power;

the resource pool is notified in the selecting condition, and the selecting condition includes a load threshold of the resource pool, the resource pool includes at least one second communications resource, the number of an occupied second communications resource in the resource pool exceeds the load threshold.

On the basis of the fourteenth practicable implementing manner of the third aspect, in a sixteenth practicable implementing manner, the selecting condition of the second transmission mode includes any one of the following conditions:

the resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor;

the resource pool is notified in the selecting condition, and the selecting condition includes a threshold of downlink receiving power for using the first transmission mode, the downlink receiving power of the base station is measured, and the downlink receiving power is smaller than the threshold of the downlink receiving power;

the resource pool is notified in the selecting condition, and the selecting condition includes a load threshold of the resource pool, the resource pool includes at least one second communications resource, the number of an occupied second communications resource in the resource pool is smaller than the load threshold.

In the embodiments of the present disclosure, when it is detected that the first transmission mode for sending data cannot be used, the second transmission mode is used to send data, and when the first transmission mode can be used, the using of the second transmission mode is stopped and the first transmission mode is used to send data. In the present embodiment, constant conversions are made between the first transmission mode and the second transmission mode can avoid a situation of communications interruption when a currently-used transmission mode cannot be used, and the method is practical.

BRIEF DESCRIPTION OF DRAWINGS

To make technical solutions of the present disclosure or the prior art more clearly, the following introduces accompanying drawings used in description of the embodiments of the present disclosure briefly. Apparently, the accompanying drawings merely show some embodiments of the disclosure, and persons skilled in the art can derive other drawings from them without creative efforts.

DESCRIPTION OF EMBODIMENTS

Figure 1:
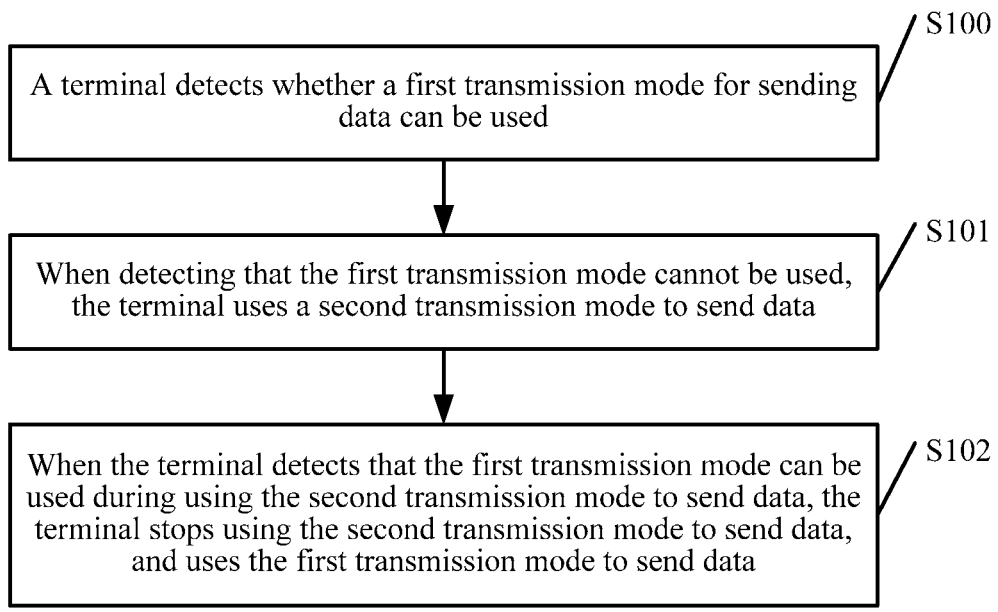
FIG. 1 is a schematic flow diagram of a method for transmission mode conversion provided by the present disclosure.

Technical solutions in embodiments of the present disclosure will be described clearly and completely with reference to accompanying drawings in the embodiments of the present disclosure. Obviously, the embodiments described are only part of the embodiments of the present disclosure, but not all of the embodiments. Based on the embodiments of the present disclosure, all of other embodiments obtained by those skilled in the art without creative efforts fall within the protection scope of the present disclosure.

In the embodiments of the present disclosure, a first transmission mode refers to that a terminal sends data through a first communications resource allocated by a base station, detailed steps may include: the terminal establishes a wireless connection with the base station, requests a first communications resource from the base station, and the base station allocates the first communications resource according to actual conditions. For example, in D2D communications, the first communications resource may be a D2D communications resource block, the terminal can only use the first communications resource allocated by the base station to send data. A second transmission mode refers to that a terminal sends data through a second communications resource selected from a resource pool allocated by a base station or that the terminal sends data through a pre-configured third communications resource. The specific process may include: a base station pre-allocates a resource pool for a terminal, where the resource pool can be configured to the terminal when the base station establishes a wireless connection, or can be carried in a broadcast message. The resource pool includes a plurality of communications resources, for example, in D2D communications, the resource pool allocated by the base station to the terminal includes a collection of D2D communications resource blocks. When the terminal needs to use the second communications resource to send data, it selects from the resource pool a second communications resource, which is suitable for the terminal, to send the data.

Furthermore, there are multiple manners for configuring the resource pool. When a terminal is converted to the second transmission mode due to a wireless connection failure, wireless connection request being rejected, or wireless connection resource being released, a resource pool (or called resource collection) of the second transmission mode can be notified to the terminal through a wireless connection establishment or wireless connection reconfiguration message. When none of the above three types of messages carries the resource pool of the second transmission mode, configuration information of the resource pool of the second transmission mode will be carried in a cell broadcast message.

It should be noted that when a terminal camps on a target cell and locates at an edge of the target cell where an uplink coverage range is smaller than a downlink coverage range, that is, the base station cannot receive a wireless connection establishment request sent by the terminal, the terminal can use an inherent third communications resource to send data. The inherent third communications resource is stored by the terminal in its storage device.

In the embodiments of the present disclosure, whether for a conversion from the first transmission mode to the second transmission mode or for a conversion from the second transmission mode to the first transmission mode, if a data packet has been sent for a first time by using the resource of a mode, mode conversion should be performed after subsequent retransmissions using the resource of the same mode are finished. In this way, conversion of the transmission mode will not cause reception reliability of the data packet to decrease during mode conversion.

The method for mode conversion according to the embodiments of the present disclosure can be applied to D2D devices for sending data. When a D2D device is located at an edge of a cell or in an area without network coverage due to movement of a user, resulting in that a currently-used transmission mode which uses a first communications resource allocated by the base station to send data cannot be used, the D2D device may convert the transmission mode for sending data, i.e. converting to the second transmission mode, and thus communications interruption will not occur.

The method for transmission mode conversion provided by the embodiments of the present disclosure will be illustrated in detail with reference to FIG. 1 to FIG. 11.

Please refer to FIG. 1, which is a schematic flow diagram of a method for transmission mode conversion provided by an embodiment of the present disclosure. The method may include step S100 to step S102 as follows.

S100, a terminal detects whether a first transmission mode for sending data can be used.

In an embodiment, the detecting, by a terminal, whether a first transmission mode for sending data can be used, may be: continuously detecting whether the first transmission mode can be used during using the first transmission mode, or may be: detecting whether the first transmission mode can be used when establishing a wireless connection with a base station for the first time. The specific detecting method may be sending a connection establishment request to the base station, or may be detecting whether the established wireless connection is failed, or may be detecting whether a resource release message sent by a base station is received etc.

S101, when detecting that the first transmission mode cannot be used, the terminal uses a second transmission mode to send data.

In an embodiment, the terminal may detect that the first transmission mode cannot be used, for example, a wireless connection failure occurs, when using the first transmission mode to send data; or may detect that the first transmission mode cannot be used when the terminal has selected the first transmission mode to send data but has not used the first transmission mode to send data. The situation that a wireless connection failure occurs may be that the downlink signal power received by the terminal is very poor (downlink receiving power is lower than a preset threshold, or a physical layer of the terminal reports that a link is out of synchronization, or a timer of the terminal for waiting for recovering of link synchronization is started), or may be that a radio link control (RLC) layer reaches a maximum number of transmission times, or may be that a media access control (MAC) layer of the terminal reports to the radio resource control (RRC) layer that a random access channel (RACH) has a problem. In addition, detecting that the first transmission mode cannot be used may also be that a cellular uplink resource is not successfully obtained during a process of requesting a first communications resource, for example, the terminal sends a scheduling request (SR) multiple times to request a cellular uplink resource, but no cellular uplink resource is available at the base station until the transmission times of the SR exceeds dsr-TransMax (the maximum number of transmission times for a designated SR). When detecting that the first transmission mode cannot be used, the transmission mode for sending data is converted, and the second transmission mode is used to send data.

Specifically, transmission mode conversion in a D2D device is taken as an example for illustration. The D2D device is using the first transmission mode to send data; when detecting that the first transmission mode cannot be used, an RRC layer of the terminal sends an instruction (or called primitive) of "stopping the first transmission mode of the D2D device" to a MAC layer; the MAC layer sets "D2D TransMode" to the second transmission mode, and stops using the first transmission mode to send data in a data buffer, and clears an allocation grant of the first communications resource allocated by the base station. The second transmission mode is used to send data, the second transmission mode may be that the terminal selects a second communications resource from the resource pool to send data, or uses an inherent third communications resource to send data. It should be noted that the resource pool here may be configured to the terminal through an information element of a dedicated signaling, for example, RadioResourceConfigDedicated, when the base station configures a D2D resource to the terminal or, may be acquired from broadcast information when the terminal camps on a target cell and be recorded in its own internal storage module.

S102, when the terminal detects that the first transmission mode can be used during using the second transmission mode to send data, the terminal stops using the second transmission mode to send data, and uses the first transmission mode to send data.

The first transmission mode refers to that the terminal sends data through a first communications resource allocated by the base station, and the second transmission mode refers to that the terminal sends data through a second communications resource selected from a resource pool configured by the base station or uses the inherent third communications resource to send data.

In an embodiment, the terminal detects whether the first transmission mode can be used during using the second transmission mode to send data, and a specific detecting method may be: detecting according to a reason why the first transmission mode cannot be used. For example, when the reason why the first transmission mode cannot be used is a wireless connection failure, the detecting method can be: performing detection of wireless connection status, and determining that the first transmission mode can be used when it is detected that the wireless connection status is well-run, that is, the following two types of messages are not received, which may be: 1) a report of out of synchronization or a RACH problem report from a physical layer; 2) a report of reaching a maximum number of transmission times from the RLC layer. If at least one of these two messages is received, the first transmission mode is still determined as being unable to be used.

Furthermore, when it is detected that the first transmission mode can be used, the using of the second transmission mode to send data is stopped and the first transmission mode is used to send data. Specifically, a method for detecting that the first transmission mode can be used may be that when wireless connection reestablishment is successful, that is, when receiving a reestablishment complete message (e.g. RRCconnectionreestablishment message) from the base station, the terminal determines that the first transmission mode can be used, or may be that the base station allocates a first communications resource for the terminal through reconfiguration, or may be that the base station allocates a cellular uplink resource according to a scheduling request reported by the terminal etc., and the specific method can be determined according to the detecting method.

Specifically, transmission mode conversion in a D2D device is taken as an example for illustration here. When the D2D device detects that the first transmission mode can be used, the RRC layer sends an instruction of "activating the first transmission mode" to the MAC layer, the MAC layer sets "D2D TransMode" to the first transmission mode after receiving the instruction, and the terminal uses the first transmission mode to send data.

In the embodiment of the present disclosure, when it is detected that a first transmission mode for sending data cannot be used, a second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 2:
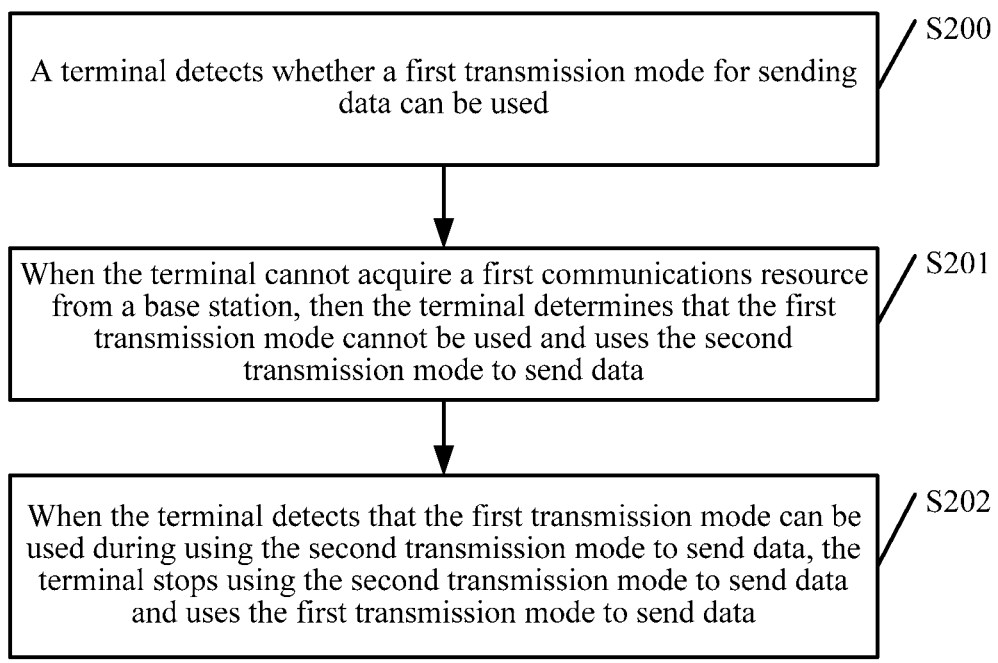
FIG. 2 is a schematic flow diagram of another method for transmission mode conversion provided by the present disclosure.

Please refer to FIG. 2, which is a schematic flow diagram of another method for transmission mode conversion provided by an embodiment of the present disclosure. The method can include step S200 to step S202 as follows.

S200, a terminal detects whether a first transmission mode for sending data can be used.

For step S200 of this embodiment of the present disclosure, reference may be made to step S100 shown in FIG. 1, which will not be repeated here.

S201, when the terminal cannot acquire a first communications resource from a base station, the terminal determines that the first transmission mode cannot be used and uses the second transmission mode to send data.

As an alternative implementing manner, the method for detecting that the first transmission mode cannot be used may be: detecting whether the terminal can acquire a first communications resource from the base station, and when the terminal fails to acquire the first communications resource from the base station, determining that the first transmission mode cannot be used and using the second transmission mode to send data.

Specifically, the reason why the terminal fails to acquire the first communications resource may be that a wireless connection cannot be established with the base station, or may be that the wireless connection is established with the base station but the base station does not allocate the first communications resource.

S202, when the terminal detects that the first transmission mode can be used during using the second transmission mode to send data, the terminal stops using the second transmission mode to send data and uses the first transmission mode to send data.

For step S202 of this embodiment of the present disclosure, reference may be made to step S102 shown in FIG. 1, which will not be repeated here.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 3:
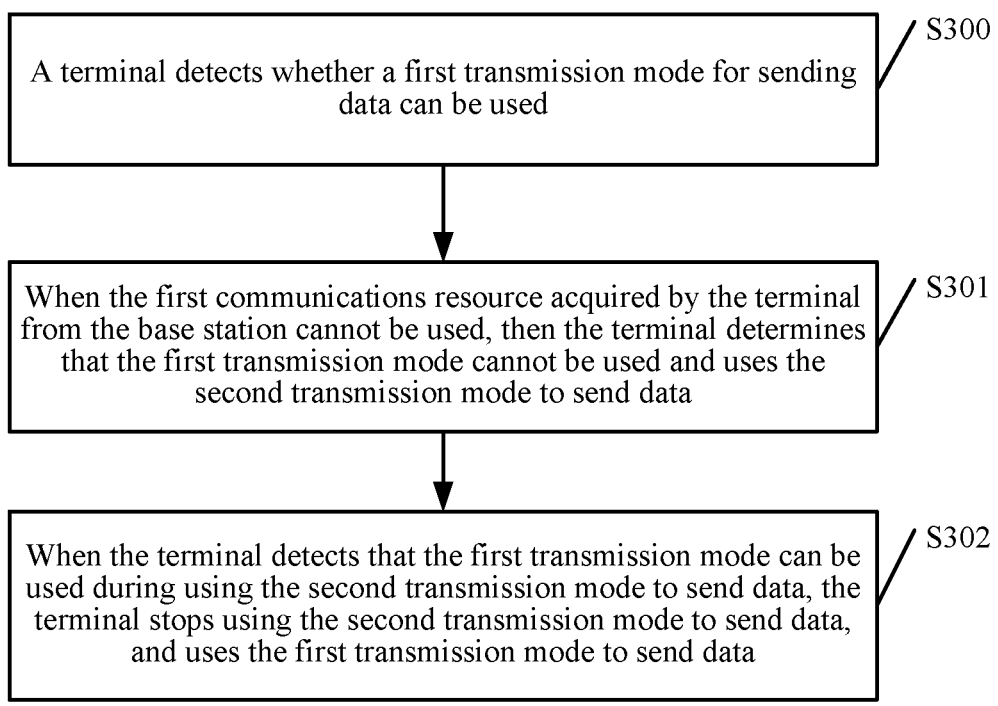
FIG. 3 is a schematic flow diagram of still another method for transmission mode conversion provided by the present disclosure.

Please refer to FIG. 3, which is a schematic flow diagram of still another method for transmission mode conversion provided by an embodiment of the present disclosure. The method may include step S300 to step S302 as follows.

S300, a terminal detects whether a first transmission mode for sending data can be used.

For step S300 of this embodiment of the present disclosure, reference may be made to step S100 shown in FIG. 1, which will not be repeated here.

S301, when the first communications resource acquired by the terminal from the base station cannot be used, the terminal determines that the first transmission mode cannot be used and uses the second transmission mode to send data.

As an alternative implementing manner, the method for detecting that the first transmission mode cannot be used may be: detecting whether the first communications resource acquired by the terminal from the base station can be used, and when the first communications resource acquired by the terminal from the base station cannot be used, determining that the first transmission mode cannot be used, and using the second transmission mode to send data.

Specifically, the reason why the first communications resource acquired by the terminal from the base station cannot be used may be that a wireless connection failure occurs during using of the first transmission mode, or may be that the base station sends a resource release message during using of the first transmission mode.

S302, when the terminal detects that the first transmission mode can be used during using the second transmission mode to send data, the terminal stops using the second transmission mode to send data, and uses the first transmission mode to send data.

For step S302 of this embodiment of the present disclosure, reference may be made to step S102 shown in FIG. 1, which will not be repeated here.

In this embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 4:
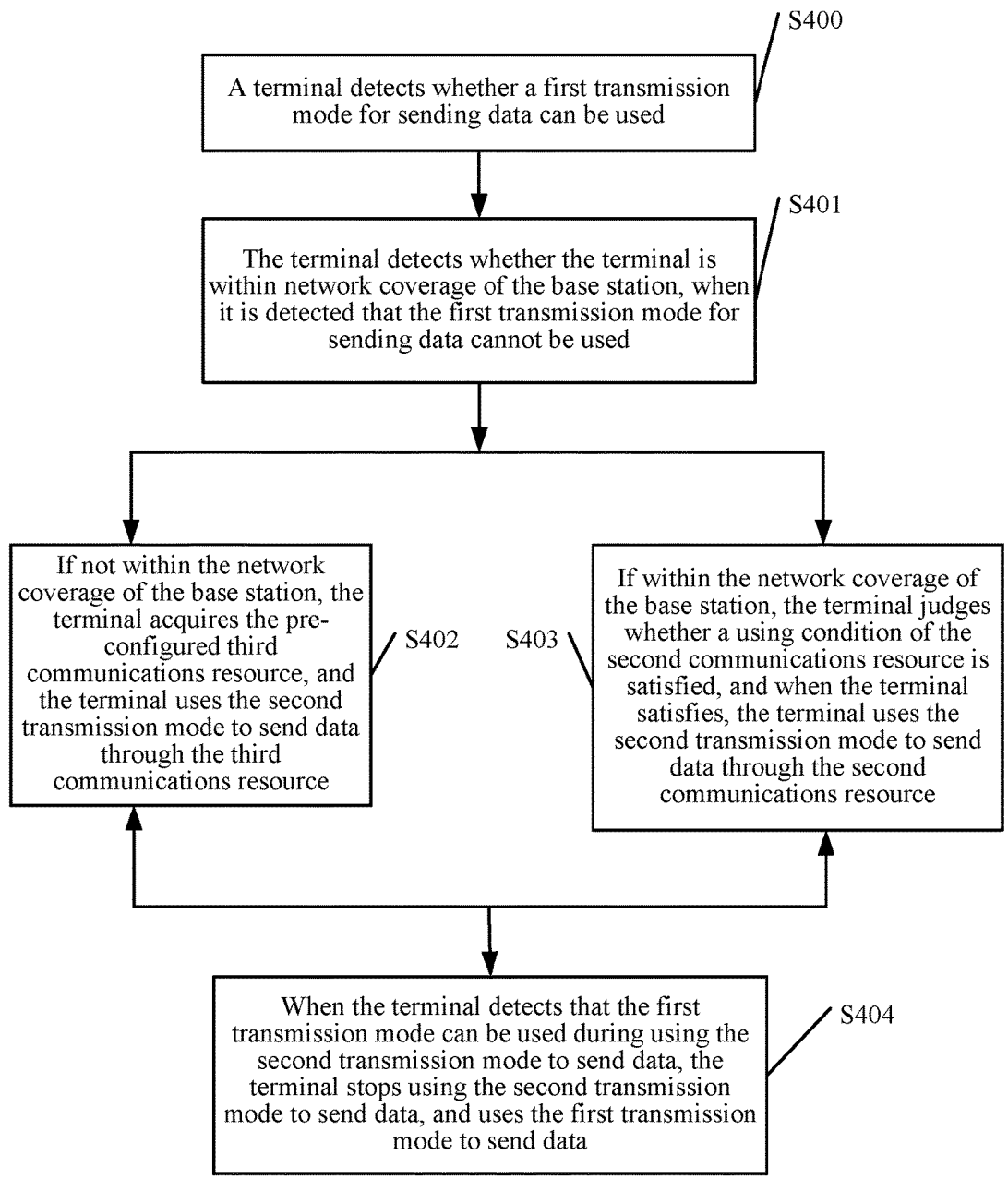
FIG. 4 is a schematic flow diagram of still another method for transmission mode conversion provided by the present disclosure.

Please refer to FIG. 4, which is a schematic flow diagram of still another method for transmission mode conversion provided by an embodiment of the present disclosure. The method may include step S400 to step S404 as follows.

S400, a terminal detects whether a first transmission mode for sending data can be used.

For step S400 of this embodiment of the present disclosure, reference may be made to step S100 shown in FIG. 1, which will not be repeated here.

S401, the terminal detects whether the terminal is within network coverage of the base station, when it is detected that the first transmission mode for sending data cannot be used.

As an alternative implementing manner, when a configuration message sent from base station to the terminal indicates that the first transmission mode cannot be used and the second transmission mode can be used, the terminal needs to further judge whether the second transmission mode can be used, and firstly needs to detect whether the terminal is within the network coverage of the base station.

S402, the terminal acquires an inherent third communications resource, if the terminal is not within the network coverage of the base station, and the terminal uses the second transmission mode to send data through the third communications resource.

As an alternative implementing manner, if the terminal is not within the network coverage of the base station, it means that the base station does not configure a resource pool for the terminal, the terminal can only use the second transmission mode to send data through a pre-configured third communications resource and therefore needs to acquire the pre-configured third communications resource and uses the second transmission mode to send data through the third communications resource.

S403, if the terminal is within the network coverage of the base station, the terminal judges whether a using condition of the second communications resource is satisfied, and when the terminal satisfies the using condition of the second communications resource, selects the second communications resource from a resource pool configured by the base station, and the terminal uses the second transmission mode to send data through the second communications resource.

The using condition of the second transmission mode includes at least one of the following conditions:

downlink receiving power of the terminal is lower than a preset threshold;

the base station configures the resource pool for the terminal.

As an alternative implementing manner, when the terminal is within the network coverage of the base station, it means that the base station may have configured a resource pool for the terminal, the terminal may be able to use the second transmission mode to send data through the second communications resource. Therefore, whether the terminal satisfies the using condition of the second communications resource needs to be judged further. When the terminal satisfies the using condition of the second communications resource, the terminal performs an action of converting to the second transmission mode, that is, selecting the second communications resource from the resource pool configured by the base station and using the second transmission mode to send data through the second communications resource. If the using condition of the second communications resource is not satisfied, the terminal does not perform transmission mode conversion.

It should be noted that the using condition of the second communication includes any one or two of the following conditions: 1) downlink receiving power of the terminal is lower than a preset threshold; 2) the base station configures a resource pool for the terminal.

S404, when the terminal detects that the first transmission mode can be used during using the second transmission mode to send data, the terminal stops using the second transmission mode to send data, and uses the first transmission mode to send data.

For step S404 of this embodiment of the present disclosure, reference may be made to step S101 shown in FIG. 1, which will not be repeated here.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 5:
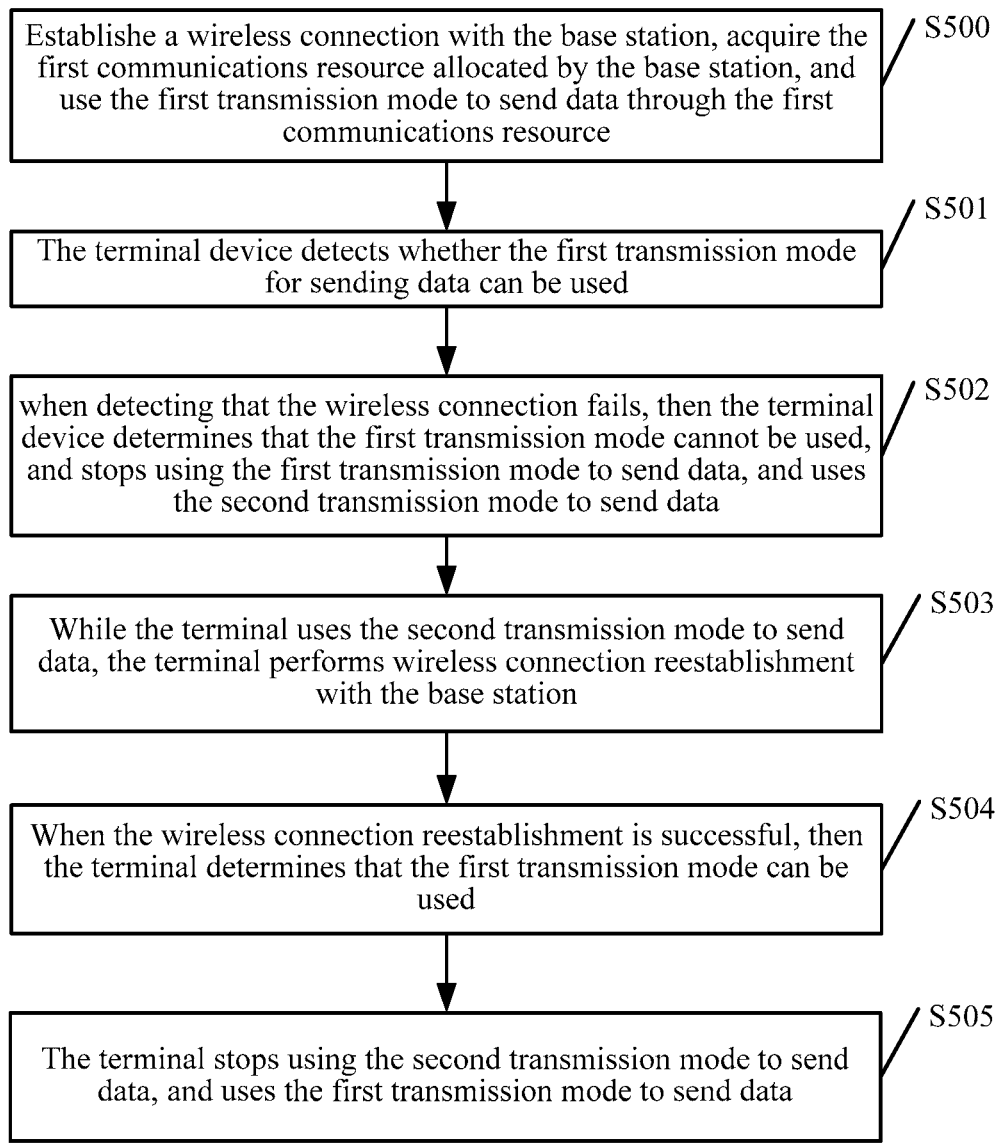
FIG. 5 is a schematic flow diagram of still another method for transmission mode conversion provided by the present disclosure.

Please refer to FIG. 5, which is a schematic flow diagram of still another method for transmission mode conversion provided by an embodiment of the present disclosure. The method can include step S500 to step S505 as follows.

S500, the terminal establishes a wireless connection with the base station, acquires the first communications resource allocated by the base station, and uses the first transmission mode to send data through the first communications resource.

As an alternative implementing manner, when the terminal needs to send data, it will first establish a wireless connection with a base station, the base station will allocate a first communications resource according to an actual condition of the terminal, the terminal acquires the allocated first communications resource from the base station by using the established wireless connection, and uses the first transmission mode to send data. It should be noted that the first transmission mode refers to sending data through the first communications resource.

Transmission mode conversion in a D2D device is taken as an example for illustration here. After a D2D device camps on an appropriate cell, when it finds that its D2D module has data to send, it will initiate a connection establishment request used to establish a wireless connection, according to an instruction of "D2D communication permitted" broadcasted by the base station, where the request message carries an establishment cause of "D2D communication request". After the base station responds to the request and establishes the wireless connection (i.e. receiving RRC-connectionSetup), an RRC layer will instruct a MAC layer to set "D2D TransMode" to the first transmission mode, and at this time the terminal will report its D2D buffering status to the base station, the base station will allocate the first communications resource, i.e. a D2D communications resource, according to the size of the D2D communication data buffer, and the terminal acquires the first communications resource allocated by the base station and sends data on the first communications resource allocated by the base station, that is, using the first transmission mode to send data.

S501, the terminal detects whether the first transmission mode for sending data can be used.

For step S501 of this embodiment of the present disclosure, reference may be made to step S100 shown in FIG. 1, which will not be repeated here.

S502, when detecting that the wireless connection fails, the terminal determines that the first transmission mode cannot be used, stops using the first transmission mode to send data, and uses the second transmission mode to send data.

As an alternative implementing manner, when a wireless connection failure is detected during using the first transmission mode to send data, the terminal determines that the first transmission mode cannot be used, immediately stops using the first transmission mode to send data, and uses the second transmission mode to send data. It should be noted that using the second transmission mode to send data may be that the terminal selects a second communications resource suitable for the terminal from a resource pool and uses the second communications resource to send data. It should be noted that the resource pool here may be configured to the terminal through an information element in a dedicated signaling, for example, RadioResourceConfigDedicated, when the base station configures a resource to the terminal; or, may be acquired from the broadcast information when the terminal camps on a target cell and be recorded in its own internal storage module.

The transmission mode conversion in the D2D device is also taken as an example for illustration here. When the D2D device moves to an edge of a cell or enters into an area without network coverage (e.g. basement), since the downlink signal power received by the D2D device is very poor, or the RLC layer reaches a maximum number of transmission times, or the MAC layer of the terminal reports to the RRC layer that a RACH has a problem, the terminal judges that a wireless link failure, i.e. a wireless connection failure, occurs, and determines that the first transmission mode cannot be used. At this time, the terminal needs to convert from the first transmission mode to the second transmission mode, the RRC layer of the terminal sends an instruction of "stopping the first transmission mode of the D2D device" (or called primitive) to the MAC layer, the MAC layer sets the "D2D TransMode" to the second transmission mode, and stops sending data in the data buffer, and clears an allocation grant of first communications resource allocated by the base station (an action may be: setting the grant as disable). The terminal selects a second communications resource from the resource pool, and uses the second communications resource to send data, that is, using the second transmission mode to send data.

S503, while the terminal uses the second transmission mode to send data, the terminal performs wireless connection reestablishment with the base station.

As an alternative implementing manner, when a wireless connection failure is detected, the terminal continues performing wireless connection reestablishment while using the second transmission mode to send data.

S504, when the wireless connection reestablishment is successful, the terminal determines that the first transmission mode can be used.

As an alternative implementing manner, while performing wireless connection reestablishment, the terminal receives a wireless connection reestablishment successful message sent from a base station, which means that the wireless connection reestablishment is successful, the terminal requests the base station to allocate a first communications resource, and when acquiring the first communications resource allocated by the base station, the terminal determines that the first transmission mode can be used.

S505, the terminal stops using the second transmission mode to send data, and uses the first transmission mode to send data.

As an alternative implementing manner, the terminal stops using the second transmission mode to send data, and uses the first transmission mode to send data. A D2D device is taken as an example for illustration here. An RRC layer in the D2D device sends an instruction to a MAC layer to instruct the MAC layer to use the first transmission mode. After receiving the instruction, the MAC layer sets "D2D TransMode" to the first transmission mode. At the same time, the MAC layer stops using the second transmission mode to send data.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 6:
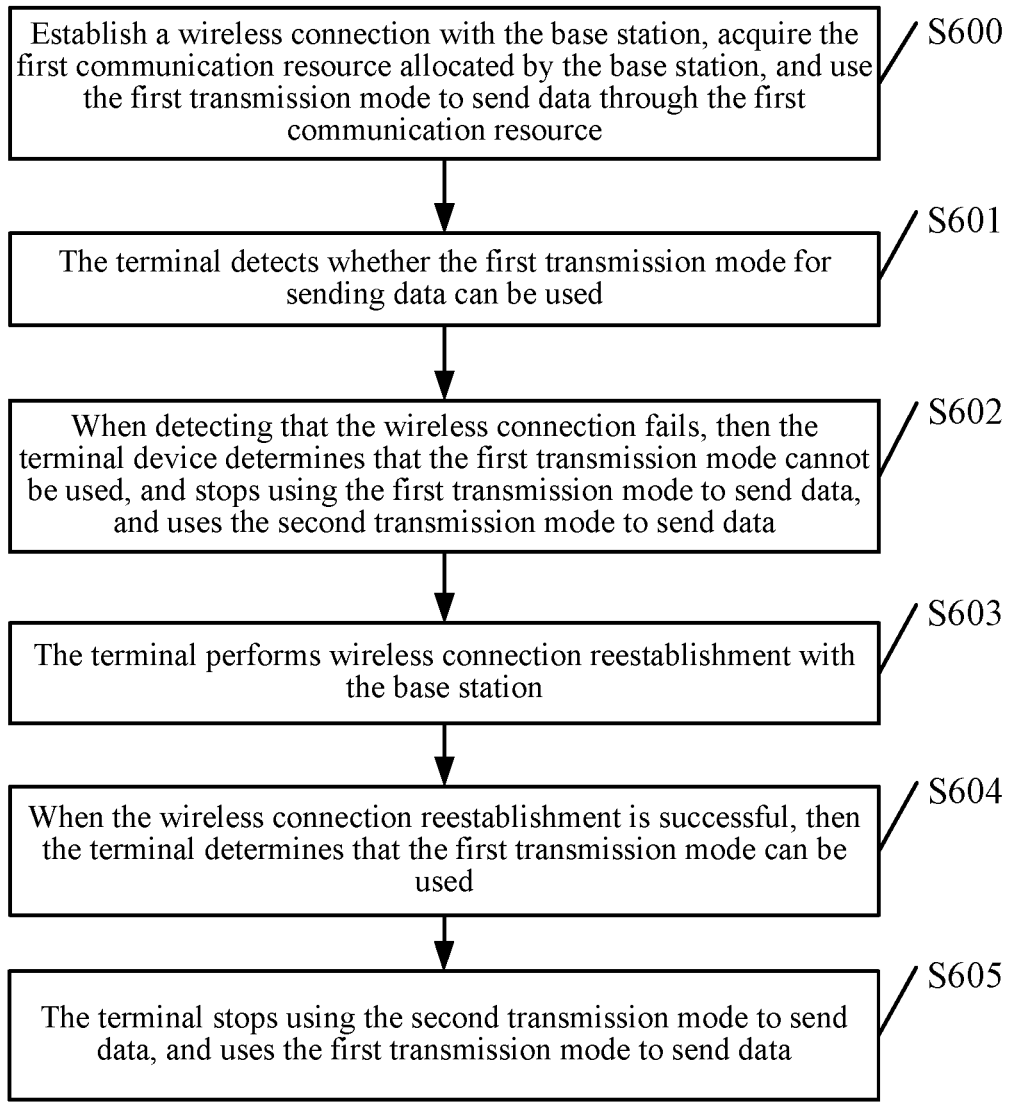
FIG. 6 is a schematic flow diagram of still another method for transmission mode conversion provided by the present disclosure.

Please refer to FIG. 6, which is a schematic flow diagram of still another method for transmission mode conversion provided by an embodiment of the present disclosure. The method may include step S600 to step S604 as follows.

S600, establish a wireless connection with the base station, acquire the first communications resource allocated by the base station, and use the first transmission mode to send data through the first communications resource.

For step S600 of this embodiment of the present disclosure, reference may be made to step S500 shown in FIG. 5, which will not be repeated here.

S601, a terminal detects whether the first transmission mode for sending data can be used.

For step S601 of this embodiment of the present disclosure, reference may be made to step S100 shown in FIG. 1, which will not be repeated here.

S602, when detecting that the wireless connection fails, the terminal determines that the first transmission mode cannot be used, stops using the first transmission mode to send data, and uses the second transmission mode to send data after a first preset time.

As an alternative implementing manner, when detecting a wireless connection failure during using the first transmission mode to send data, the terminal determines that the first transmission mode cannot be used, immediately stops using the first transmission mode to send data, and uses the second transmission mode to send data after a first preset time. It should be noted that using the second transmission mode to send data may be that: the terminal selects a second communications resource which is suitable for the terminal from a resource pool, and uses the second communications resource to send data. The resource pool here may be configured to the terminal through an information element in a dedicated signaling, for example, a RadioResourceConfigDedicated, when the base station configures a resource to the terminal, or, may be acquired from broadcast information when the terminal camps on a target cell and be recorded in its own internal storage module.

The first preset time can be configured to the terminal by the base station after a wireless connection is established between the terminal and the base station, or can be carried in a broadcast message of the base station. The configuration of the first preset time can balance the number of terminals which are converted to the second transmission mode, and can prevent that too many terminals convert to the second transmission mode when more terminals are concentrated at the edge of the cell, and thus avoid sudden increase of a collision rate of the second communications resource of the second transmission mode.

Transmission mode conversion in a D2D device is also taken as an example for illustration here. When the D2D device moves to an edge of the cell or enters into an area without network coverage (e.g. basement), since the downlink signal power which the D2D device received is very poor, or the RLC layer reaches a maximum number of transmission times, or the MAC layer of the terminal reports to the RRC layer that the RACH has a problem, the terminal judges that a wireless link failure, i.e. wireless connection failure, occurs, determines that the first transmission mode cannot be used. At this time, the terminal needs to convert from the first transmission mode to the second transmission mode, the RRC layer of the terminal starts a timer T350, T350 is an activation timer of the second transmission mode, the function of which is that after the timer runs for the first preset time and stops, the RRC layer sends an instruction of "stopping the first transmission mode of the D2D device" (or called primitive) to the MAC layer, the MAC layer sets "D2D TransMode" to the second transmission mode, stops sending data in the data buffer, and clears an allocation grant of the first communications resource allocated by the base station (an action can be: to set the grant as disable). The terminal selects a second communications resource from the resource pool, and uses the second communications resource to send data, that is, using the second transmission mode to send data.

S603, the terminal performs wireless connection reestablishment with the base station.

For step S603 of the embodiment of the present disclosure, reference may be made to step S503 shown in FIG. 5 and will not be repeated here.

S604, when the wireless connection reestablishment is successful, the terminal determines that the first transmission mode can be used.

For step S604 of the embodiment of the present disclosure, reference may be made to step S504 shown in FIG. 5 and will not be repeated here.

S605, the terminal stops using the second transmission mode to send data, and uses the first transmission mode to send data.

For step S605 of the embodiment of the present disclosure, reference may be made to step S505 shown in FIG. 5, which will not be repeated here.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 7:
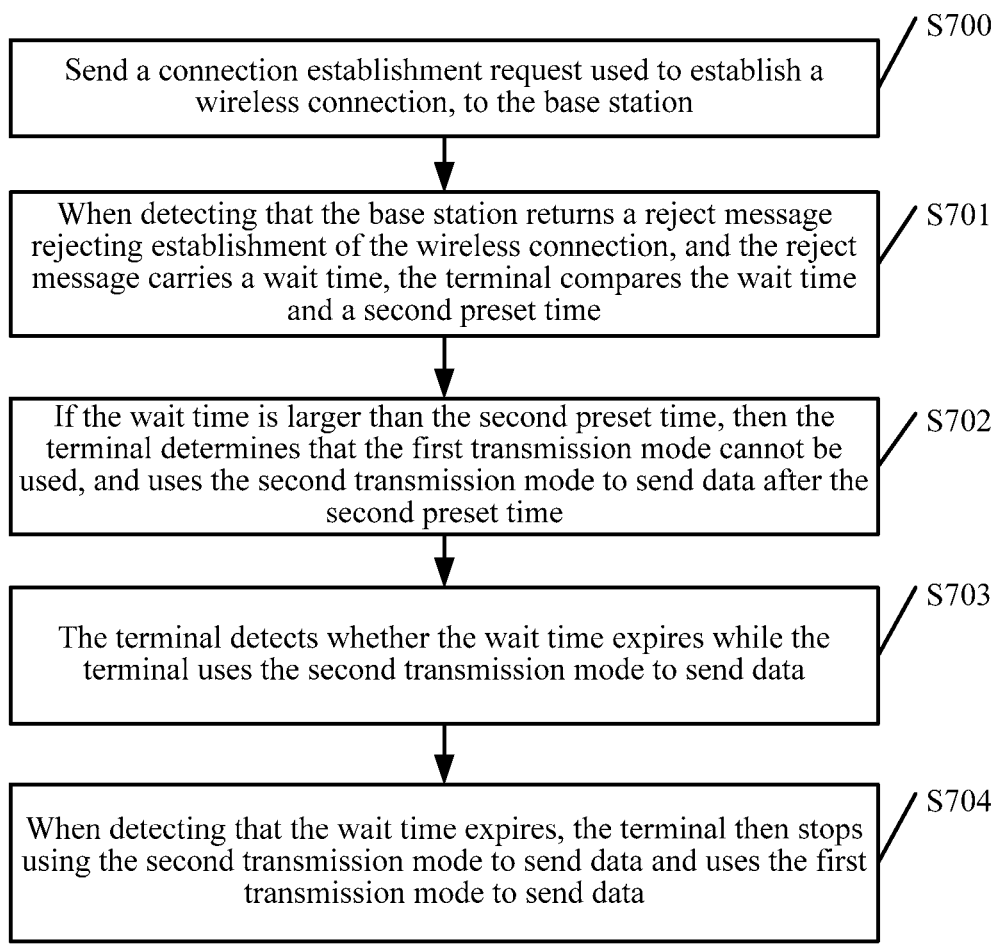
FIG. 7 is a schematic flow diagram of still another method for transmission mode conversion provided by the present disclosure.

Please refer to FIG. 7, which is a schematic flow diagram of still another method for transmission mode conversion provided by an embodiment of the present disclosure. The method may include step S700 to step S704 as follows.

S700, send a connection establishment request to the base station, where the connection establishment request is used to establish a wireless connection.

As an alternative implementing manner, when residing in a target cell, a terminal sends a connection establishment request used to establish a wireless connection, to the base station which the target cell belongs to.

S701, when detecting that the base station returns a reject message rejecting establishment of the wireless connection and the reject message carries a wait time, the terminal compares the wait time and a second preset time.

As an alternative implementing manner, when receiving a connection establishment request sent by the terminal, the base station rejects establishment of the wireless connection, and returns a reject message rejecting the establishment of the wireless connection, that is, returning an RRCconnectionReject message, and the message carries a wait time, i.e. "waittime" or "extendwaittimer", or the RRCconnectionReject message carries a wait time of the first transmission mode, i.e. "Mode1-waittimer", and furthermore, the reject message may further carries a reject reason, such as "suggest using the second transmission mode". When the terminal receives the reject message, it compares the wait time in the reject message and the second preset time. It should be noted that the second preset time can be configured by the base station to the terminal, or can be carried in a broadcast message of the base station.

S702, if the wait time is larger than the second preset time, the terminal determines that the first transmission mode cannot be used, and uses the second transmission mode to send data after the second preset time.

As an alternative implementing manner, if the wait time returned by the base station is larger than the second preset time, that is, the terminal still cannot establish a wireless connection with the base station after waiting for the second preset time, it is determined that the first transmission mode cannot be used, the terminal uses the second transmission mode to send data after the second preset time. It should be noted that using the second transmission mode to send data can be: the terminal selects a second communications resource which is suitable for the terminal from the resource pool and uses the second communications resource to send data. The resource pool here can be configured to the terminal through an information element in a dedicated signaling, for example, RadioResourceConfigDedicated, when the base station configures a resource for the terminal, or, can be acquired from broadcast information by the terminal when it camps on a target cell and be recorded in its own internal storage module.

Specifically, here a D2D device is taken as an example for illustration. After the D2D device receives the reject message, and the wait time is larger than the second preset time, an RRC layer of the D2D device sends an instruction of "stopping the first transmission mode of the D2D device" (or called primitive) to a MAC layer, the MAC layer sets "D2D TransMode" to the second transmission mode and stops sending data in the data buffer, and clears an allocation grant of the first communications resource allocated by the base station (an action can be to set the grant as disable). The D2D device starts a timer T350, and the time length of T350 is the second preset time, and at the same time, the device also starts a timer (such as T302) corresponding to the waittimer, and the time length of T302 is the wait time; if the waittimer of the terminal still runs after T350 expires, the RRC layer of the D2D device notifies the MAC layer of using the second transmission mode to send data.

S703, the terminal detects whether the wait time expires while the terminal uses the second transmission mode to send data.

As an alternative implementing manner, during using the second transmission mode to send data, the terminal detects whether the wait time expires in real time. Specifically, taking the D2D device as an example for illustration again, whether the timer T302 corresponding to the waittimer expires is detected in real time.

S704, when detecting that the wait time expires, the terminal stops using the second transmission mode to send data and uses the first transmission mode to send data.

As an alternative implementing manner, when it is detected that the wait time expires, it means that the wait time of the first transmission mode expires, the using of the second transmission mode to send data is stopped, and the first transmission mode is used to send data. It should be noted that the stop using the second transmission mode to send data here can be: immediately stopping using the second transmission mode to send data when the wait time expires, or can be: after detecting that the wait time expires, starting to initiate a wireless connection establishment process, preparing to acquire the first communications resource, using the second transmission mode until the wireless link is established successfully, and stopping using the second transmission mode to send data after the wireless link is established successfully, and using the first transmission mode to send data.

Specifically, the D2D device is taken as an example for illustration here. When receiving a reject message, the D2D device can set the time length of the timer T302 or T351 to the wait time, and when detecting that the timer expires, the D2D device initiates a wireless connection establishment process, that is, sending "RRCconnectionSetupRequest", and when the D2D device receives an "RRCconnectionSetup" message from the base station, the RRC layer sends an instruction of "activating the first transmission mode" to the MAC layer. The MAC layer sets "D2D TransMode" to the first transmission mode after receiving the instruction, and the D2D device uses the first transmission mode to send data and stops using the second transmission mode to send data.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 8:
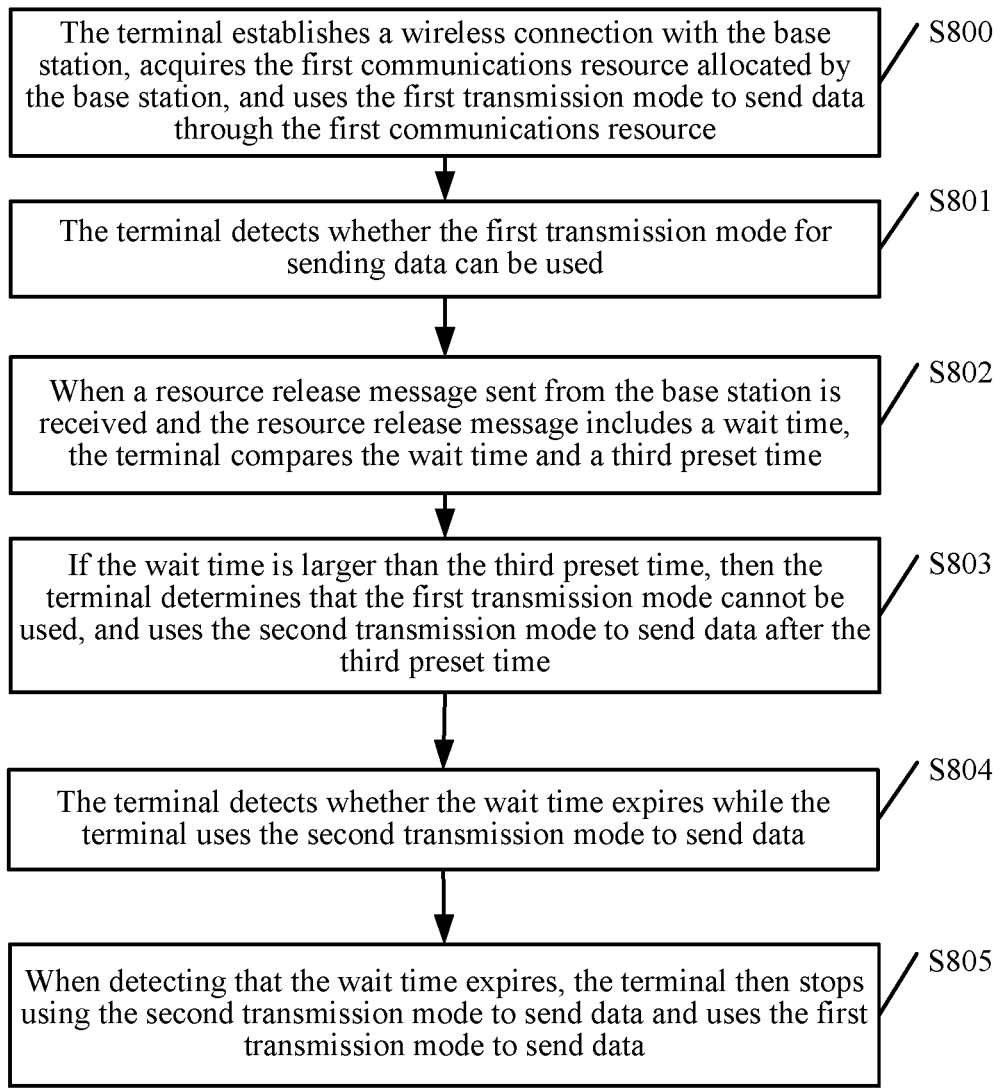
FIG. 8 is a schematic flow diagram of still another method for transmission mode conversion provided by the present disclosure.

Please refer to FIG. 8, which is a schematic flow diagram of still another method for transmission mode conversion provided by an embodiment of the present disclosure. The method may include step S800 to step S805 as follows.

S800, the terminal establishes a wireless connection with the base station, acquires the first communications resource allocated by the base station, and uses the first transmission mode to send data through the first communications resource.

For step S800 of the embodiment of the present disclosure, reference may be made to step S500 shown in FIG. 5, which will not be repeated here.

S801, the terminal detects whether the first transmission mode for sending data can be used.

For step S801 of the embodiment of the present disclosure, reference may be made to step S100 shown in FIG. 1, which will not be repeated here.

S802, when a resource release message sent from the base station is received and the resource release message includes a wait time, the terminal compares the wait time and a third preset time.

As an alternative implementing manner, when using the first transmission mode to send data through the first communications resource, the terminal receives a resource release message sent by the base station, where the resource release message carries the wait time, which means that during the wait time the base station is to release the first communications resource allocated for the terminal and the terminal cannot use the first communications resource to send data. The terminal compares the wait time with the third preset time. It should be noted that the third preset time can be configured by the base station to the terminal, or can be carried in a broadcast message of the base station.

Specifically, a D2D device is taken as an example for illustration here. The D2D device receives a resource release message, i.e. an RRCconnectionRelease message, sent by the base station, and the message carries a wait time, i.e. "waittime" or "Model-waittimer", and further, the message may also carry a release reason such as "use the second transmission mode"; and the D2D device compares the wait time and the third preset time.

S803, if the wait time is larger than the third preset time, the terminal determines that the first transmission mode cannot be used, and uses the second transmission mode to send data after the third preset time.

As an alternative implementing manner, if the wait time is larger than the third preset time, that is, the terminal still cannot establish a wireless connection with the base station after the third preset time, it is determined that the first transmission mode cannot be used, the terminal uses the second transmission mode to send data after the third preset time. It should be noted that using the second transmission mode to send data can be: the terminal selects a second communications resource which is suitable for the terminal from a resource pool, and uses the second communications resource to send data. The resource pool here can be configured to the terminal through an information element in a dedicated signaling, for example, RadioResourceConfigDedicated, when the base station configures a resource to the terminal, or, can be acquired from broadcast information when the terminal camps on the target cell and be recorded in its own internal storage module.

Specifically, the D2D device is taken as an example for illustration here. After the D2D device receives the resource release message, where the wait time is larger than the third preset time, the RRC layer of the D2D device sends an instruction of "stopping the first transmission mode of the D2D device" (or called primitive) to the MAC layer, the MAC layer sets "D2D TransMode" to the second transmission mode and stops sending data in the data buffer, and clears an allocation grant of the first communications resource allocated by the base station (an action may be setting the grant as disable). The D2D device starts a timer T350, where the time length of T350 is the third preset time, and also starts a timer (such as T302) corresponding to the waittimer at the same time, where the time length of T302 is the wait time; if the waittimer of the terminal still keeps running after T350 expires, the RRC layer of the D2D device notifies the MAC layer of activating the second transmission mode, i.e. to use the second transmission mode to send data.

S804, the terminal detects whether the wait time expires while the terminal uses the second transmission mode to send data.

For step S804 of the embodiment of the present disclosure, reference may be made to step S703 shown in FIG. 7, which will not be repeated here.

S805, when detecting that the wait time expires, the terminal stops using the second transmission mode to send data and uses the first transmission mode to send data.

For step S805 of the embodiment of the present disclosure, reference may be made to step S704 shown in FIG. 7, which will not be repeated here.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 9:
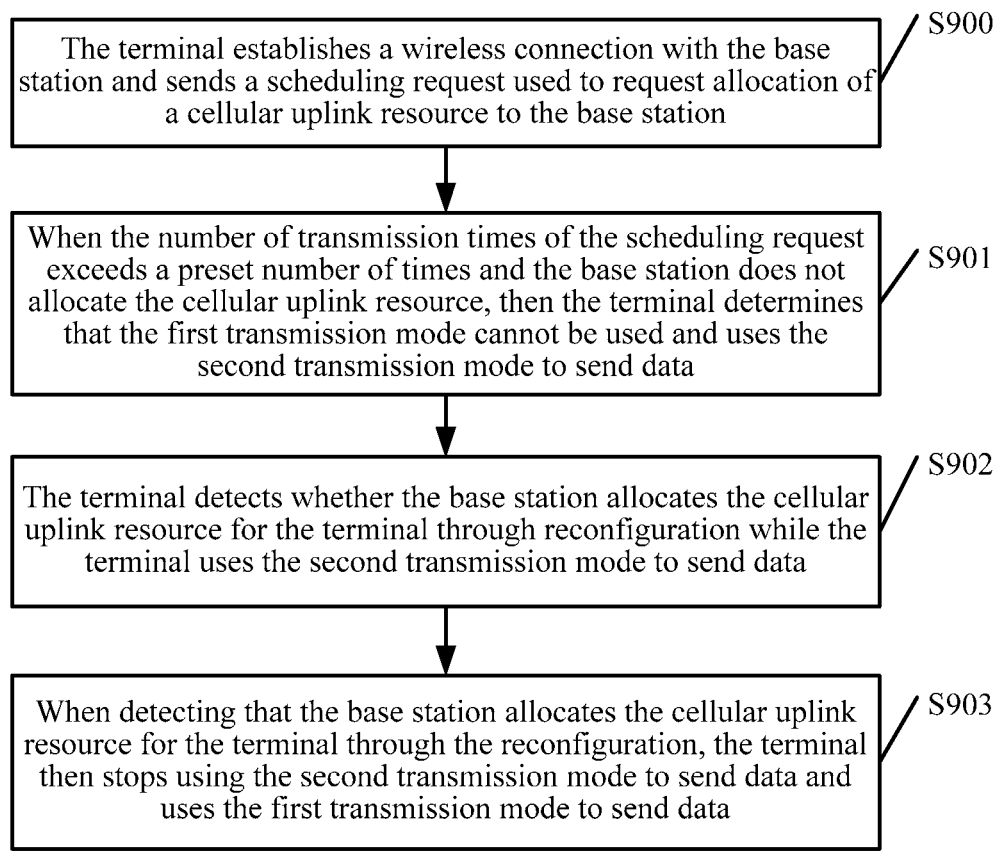
FIG. 9 is a schematic flow diagram of still another method for transmission mode conversion provided by the present disclosure.

Please refer to FIG. 9, which is a schematic flow diagram of still another method for transmission mode conversion provided by an embodiment of the present disclosure. The method may include step S900 to step S903 as follows.

S900, the terminal establishes a wireless connection with the base station and sends a scheduling request to the base station, where the scheduling request is used to request allocation of a cellular uplink resource.

As an alternative implementing manner, after establishing a wireless connection with the base station, the terminal sends a scheduling request (SR) to the base station, where the scheduling request is used to request allocation of a cellular uplink resource.

S901, when the number of transmission times of the scheduling request exceeds a preset number of times and the base station does not allocate the cellular uplink resource, the terminal determines that the first transmission mode cannot be used and uses the second transmission mode to send data.

As an alternative implementing manner, when the number of transmission times of the scheduling request exceeds a preset number of times and the base station does not allocate the cellular uplink resource, it is determined that the first transmission mode cannot be used, and the second transmission mode is used to send data.

Specifically, taking the D2D device as an example for illustration here, that is, in the D2D device, the number of transmission times of the SR request exceeds a maximum number of transmission times, but the base station still does not allocate an uplink grant, the MAC layer of the D2D device sets "D2DTransMode" to the second transmission mode and activates the second transmission mode. The MAC layer starts to use the second transmission mode to send data. It should be noted that using the second transmission mode to send may be: the terminal selects a second communications resource suitable for the terminal from a resource pool and uses the second communications resource to send data. The resource pool here can be configured to the terminal through an information element in a dedicated signaling, for example, RadioResourceConfigDedicated, when the base station configures a resource to the terminal, or may be acquired from the broadcast information when the terminal camps on a target cell and recorded in its own internal storage module.

S902, the terminal detects whether the base station allocates the cellular uplink resource for the terminal through reconfiguration while the terminal uses the second transmission mode to send data.

As an alternative implementing manner, whether the base station allocates the cellular uplink resource for the terminal through reconfiguration is detected in real time.

S903, when detecting that the base station allocates the cellular uplink resource for the terminal through the reconfiguration, the terminal stops using the second transmission mode to send data and uses the first transmission mode to send data.

As an alternative implementing manner, when it is detected that the base station allocates the cellular uplink resource for the terminal through the reconfiguration, the using of the second transmission mode to send data is stopped, and the first transmission mode is used to send data.

Specifically, the D2D device is taken as an example for illustration here. When acquiring a cellular uplink resource allocated by the base station through reconfiguration, the D2D device sets "D2DTransMode" to the first transmission mode, stops using the second transmission mode to send data, and uses the first transmission mode to send data.

Furthermore, if the wireless connection is released and the D2D device returns to an idle state, the transmission mode needs to be re-selected according to a broadcast message of the base station.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 10:
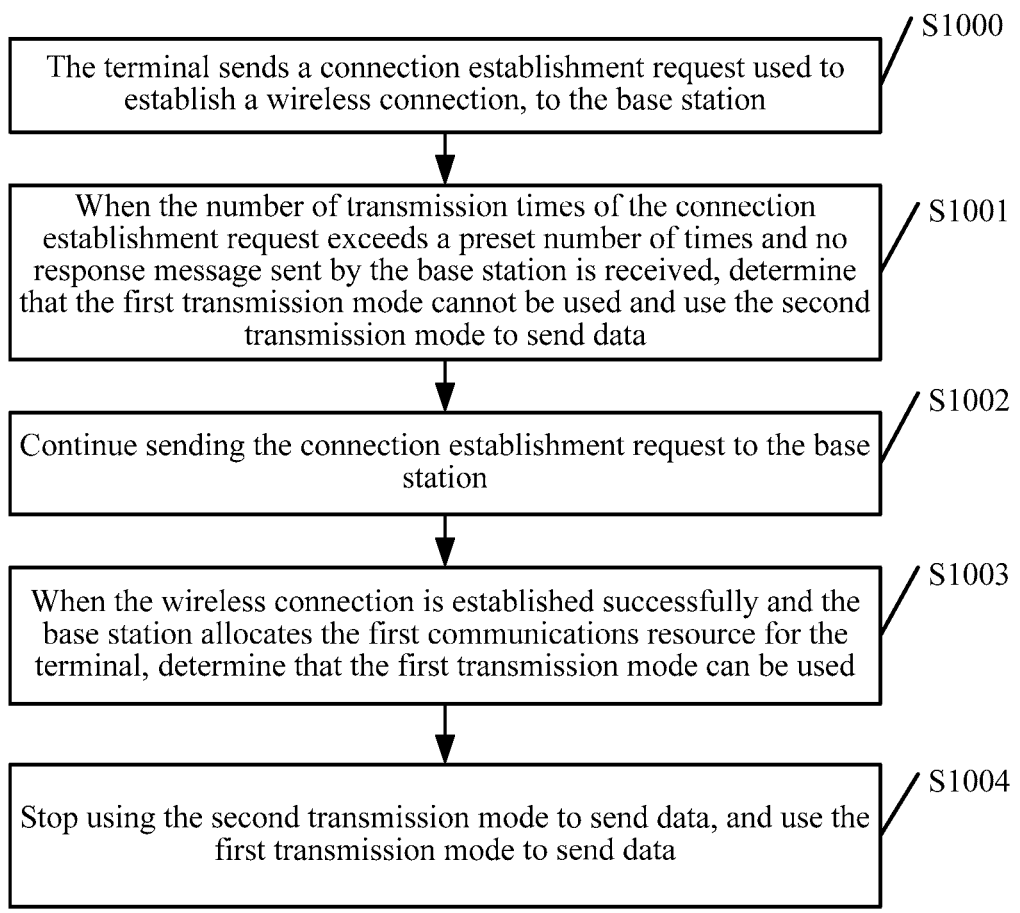
FIG. 10 is a schematic flow diagram of still another method for transmission mode conversion provided by the present disclosure.

Please refer to FIG. 10, which is a schematic flow diagram of still another method for transmission mode conversion provided by an embodiment of the present disclosure. The method may include step S1000 to step S1004 as follows.

S1000, the terminal sends a connection establishment request to the base station, where the connection establishment request is used to establish a wireless connection.

As an alternative implementing manner, when the terminal camps on a target cell and locates at the edge of the target cell where a downlink coverage range is larger than an uplink coverage range, that is, the terminal can receive a message sent by the base station, but the message sent by the terminal cannot be received by the base station. Therefore, in this case, the terminal sends a connection establishment request, which is used to establish a wireless connection, to the base station, however, the base station cannot receive the connection establishment request, but the terminal still continues sending the connection establishment request.

Specifically, taking the D2D device as an example for illustration here, the terminal continues sending a preamble so as to establish a wireless connection.

S1001, when the number transmission times of the connection establishment request exceeds a preset number of times and no response message sent by the base station is received, the terminal determines that the first transmission mode cannot be used and uses the second transmission mode to send data.

As an alternative implementing manner, when the number of transmission times of the connection establishment request exceeds a preset number of times and no response message sent by the base station is received, it is determined that the first transmission mode cannot be used, and the second transmission mode is used to send data.

Specifically, the D2D device is taken as an example for illustration here. When the number of times the D2D device sends a preamble exceeds the maximum number of preamble transmission times, T350 is started. When T350 expires, no response message (the response message includes a random access response (RAR) message, or an RRCconnectionsetup message indicating that wireless connection establishment is successful) sent by the base station is received, record N350=N350+1 (note: N350 will be initialized to be 0 after a UE camps on a cell for an hour), and meanwhile, clear T350 and continue sending the preamble. Every time T350 expires, N350 is incremented by 1, and when N350 exceeds a threshold (this threshold is called the maximum number of times for trying to establish RRC connection), still no response message from the base station is received, the MAC layer of the D2D device sets "D2DTransMode" to the second transmission mode and activates the second transmission mode. The MAC layer starts to use the second transmission mode to send data. It should be noted that the second transmission mode here refers to that the terminal uses a pre-configured third communications resource to send data.

S1002, the terminal continues sending the connection establishment request to the base station while the terminal uses the second transmission mode to send data.

As an alternative implementing manner, during using the second transmission mode to send data, the terminal continues sending the connection establishment request to the base station, i.e. continuing trying to establish a wireless connection.

Specifically, the D2D device is taken as an example for illustration here. The terminal continues trying to establish a wireless connection, and at the same time starts a timer T351; when T351 expires, if the D2D device still continues trying to establish a wireless connection, T351 is restarted. If the terminal has stopped the wireless connection establishment process, wireless connection establishment is re-initiated.

S1003, when the wireless connection is established successfully and the base station allocates the first communications resource for the terminal, the terminal determines that the first transmission mode can be used.

As an alternative implementing manner, during a process of trying to establish a wireless connection, the wireless connection is established successfully, and the base station allocates the first communications resource for the terminal, it is determined that the first transmission mode can be used.

S1004, the terminal stops using the second transmission mode to send data, and uses the first transmission mode to send data.

As an alternative implementing manner, when it is determined that the first transmission mode can be used, "D2DTransMode" is set to the first transmission mode, the using of the second transmission mode to send data is stopped, and the first transmission mode is used to send data.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 11:
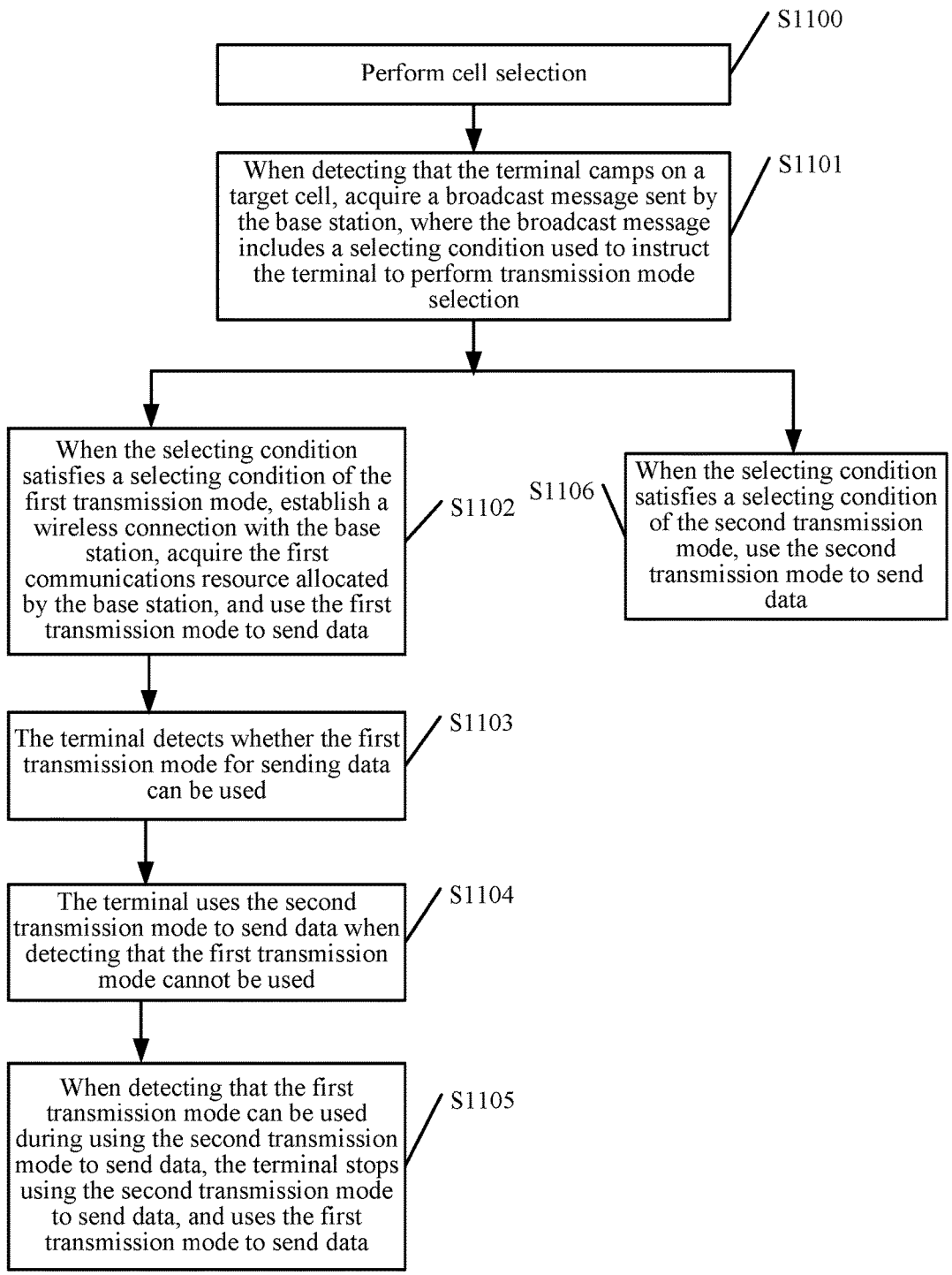
FIG. 11 is a schematic flow diagram of still another method for transmission mode conversion provided by the present disclosure.

Please refer to FIG. 11, which is a schematic flow diagram of still another method for transmission mode conversion provided by an embodiment of the present disclosure. The method may include step S1100 to step S1105 as follows.

S1100, the terminal performs cell selection.

As an alternative implementing manner, when needing to send data, the terminal needs to perform cell selection and performs transmission mode selection according to a broadcast message of the base station of the cell on which the terminal camps.

S1101, when detecting that the terminal camps on a target cell, the terminal acquires a broadcast message sent by the base station, where the broadcast message includes a selecting condition used to instruct the terminal to perform transmission mode selection, and where the target cell belongs to the base station.

As an alternative implementing manner, when detecting that the terminal camps on a target cell, a broadcast message sent by the base station is acquired, the broadcast message includes a selecting condition used to instruct the terminal to perform transmission mode selection. It should be noted that the target cell belongs to the base station.

Specifically, the D2D device is taken as an example for illustration here. The D2D device acquires from the broadcast message a D2D device transmission mode configuration message used to perform mode selection, where the configuration message includes a selecting condition for the terminal to perform transmission mode selection.

S1102, when the selecting condition satisfies a selecting condition of the first transmission mode, the terminal establishes a wireless connection with the base station, acquires the first communications resource allocated by the base station, and uses the first transmission mode to send data.

As an alternative implementing manner, when the selecting condition in the broadcast message satisfies a selecting condition of the first transmission mode, a wireless connection is established with the base station, a first communications resource allocated by the base station is acquired, and data is sent using the first transmission mode through the first communications resource.

The selecting condition of the first transmission mode includes any one of the following conditions:

A. The resource pool is not notified in the selecting condition.

Specifically, the D2D device is taken as an example for illustration here. Relevant information of the resource pool used for sending data is not notified by the selecting condition in the broadcast message, for example, if the broadcast message includes any one of the following information, only the first transmission mode can be used: 1) only notifying the D2D device of a D2D receiving resource collection of the target cell; 2) only notifying the D2D device that the target cell permits using D2D to send data; 3) only notifying the D2D device that a wireless connection should be established if D2D transmission is desired.

B. The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor.

Specifically, the D2D device is taken as an example for illustration here. The selecting condition in the broadcast message notifies relevant information of the resource pool, which means that the first transmission mode and the second transmission mode both can be used and it needs further to be determined which transmission mode needs to be used according to the random seed and the scale factor in the selecting condition. The further determining method is: the terminal inputs the random seed as an initial condition into the preset probability density function, acquires a random number, and compares the random number with the scale factor, and uses the first transmission mode to send data if the random number is larger than the scale factor in the selecting condition. The scale factor is a threshold for comparison.

C. The resource pool is notified in the selecting condition, and the selecting condition includes a threshold of downlink receiving power for using the first transmission mode, the downlink receiving power of the base station is measured, and the downlink receiving power is larger than the threshold of the downlink receiving power.

Specifically, the selecting condition in the broadcast message notifies relevant information of the resource pool, which means that the first transmission mode and the second transmission mode both can be used and it needs to be further determined which transmission mode is to be used according to the threshold of the downlink receiving power in the selecting condition. The further determining method can be: measuring the receiving power of a downlink pilot or a synchronization signal of the base station, and if the downlink receiving power is larger than the threshold of the downlink receiving power, using the first transmission mode to send data.

D. The resource pool is notified in the selecting condition, and the selecting condition includes a load threshold of the resource pool, the resource pool includes at least one said second communications resource, and the number of the occupied second communications resource in the resource pool exceeds the load threshold.

Specifically, the selecting condition in the broadcast message notifies relevant information of the resource pool, which means that the first transmission mode and the second transmission mode both can be used and it needs to be further determined which transmission mode is to be used according to the load threshold of the resource pool in the selecting condition. There are multiple second communications resources in the resource pool. The further determining method can be: the D2D device detects signal power received on each second communications resource in the resource pool, and when the signal power can be received on a second communications resource, it means that the second communications resource is occupied, and when the number of the occupied second communications resource in the resource pool exceeds the load threshold, that is, the ratio of the busy second communications resource in the resource pool exceeds the load threshold, the D2D device uses the first transmission mode.

S1103, the terminal detects whether the first transmission mode for sending data can be used.

For step S1003 of the embodiment of the present disclosure, reference may be made to step S100 shown in FIG. 1, which will not be repeated here.

S1104, the terminal uses the second transmission mode to send data when detecting that the first transmission mode cannot be used.

For step S1004 of the embodiment of the present disclosure, reference may be made to step S101 shown in FIG. 1, which will not be repeated here.

S1105, when detecting that the first transmission mode can be used during using the second transmission mode to send data, the terminal stops using the second transmission mode to send data, and uses the first transmission mode to send data.

For step S1105 of the embodiment of the present disclosure, reference may be made to step S102 shown in FIG. 1, which will not be repeated here.

S1106, when the selecting condition satisfies a selecting condition of the second transmission mode, the terminal uses the second transmission mode to send data.

As an alternative implementing manner, when the selecting condition in the broadcast message satisfies a selecting condition of the second transmission mode, the terminal uses the second transmission mode to send data.

The selecting condition of the second transmission mode includes any one of the following conditions:

A. The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is smaller than the scale factor.

Specifically, the D2D device is taken as an example for illustration here. The selecting condition in the broadcast message notifies relevant information of the resource pool, which means that the first transmission mode and the second transmission mode both can be used and which transmission mode needs be used needs to be further determined according to the random seed and the scale factor in the selecting condition. The further determining method is: the terminal inputs the random seed as an initial condition into the preset probability density function, acquires a random number, and compares the random number with the scale factor; if the random number is smaller than the scale factor in the selecting condition, the terminal used the second transmission mode to send data, where the scale factor is a threshold for comparison.

B. The resource pool is notified in the selecting condition, and the selecting condition includes a threshold of downlink receiving power for using the first transmission mode, the downlink receiving power of the base station is measured, and the downlink receiving power is smaller than the threshold of the downlink receiving power.

Specifically, the selecting condition in the broadcast message notifies relevant information of the resource pool, which means that the first transmission mode and the second transmission mode both can be used, and it needs to be further determined which transmission mode is to be used, according to the threshold of the downlink receiving power in the selecting condition. The further determining method can be: measuring the receiving power of a downlink pilot or a synchronization signal of the base station, and if the downlink receiving power is smaller than the threshold of the downlink receiving power, using the second transmission mode to send data.

C. The resource pool is notified in the selecting condition, and the selecting condition includes a load threshold of the resource pool, the resource pool includes at least one second communications resource, and the number of the occupied second communications resource in the resource pool is smaller than the load threshold.

Specifically, the selecting condition in the broadcast message notifies relevant information of the resource pool, which means that the first transmission mode and the second transmission mode both can be used, and it needs to be further determined which transmission mode is to be used, according to the load threshold of the resource pool in the selecting condition. There are multiple second communications resources in the resource pool. The further determining method may be: the D2D device detects the signal power received on each second communications resource in the resource pool, and when the signal power can be received on a second communications resource, it means that the second communications resource is occupied, and when the number of the occupied second communications resource in the resource pool is smaller than the load threshold, i.e. the ratio of the busy second communications resource in the resource pool is smaller than the load threshold, the second transmission mode is used.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 12:
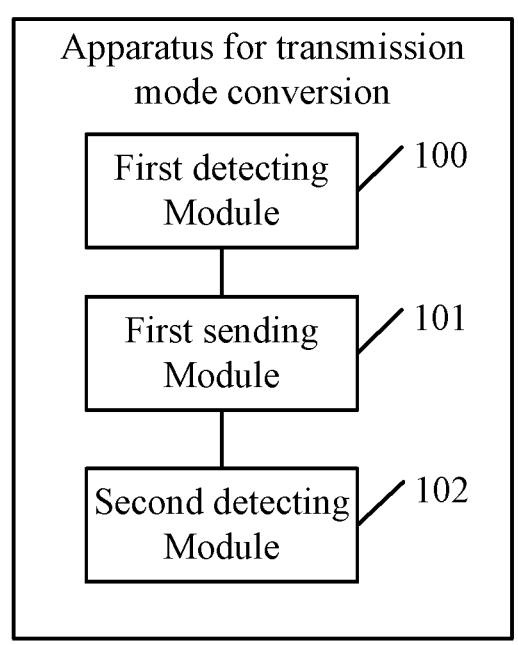
FIG. 12 is a schematic structural diagram of an apparatus for transmission mode conversion provided by the present disclosure.

Please refer to FIG. 12, which is a schematic structural diagram of an apparatus for transmission mode conversion provided by an embodiment of the present disclosure. The apparatus for transmission mode conversion can include: a first detecting module 100, a first sending module 101 and a second sending module 102.

The first detecting module 100 is configured to detect whether a first transmission mode for sending data can be used.

In an embodiment, that the first detecting module 100 of the terminal detects whether a first transmission mode for sending data can be used, may be: continuously detecting whether the first transmission mode can be used during the first transmission mode is being used, or may be: detecting whether the first transmission mode can be used when a wireless connection is established with a base station for the first time. The specific detecting method may be sending a connection establishment request to the base station, or may be detecting whether the established wireless connection is failed, or may be detecting whether a resource release message is received etc.

The first sending module 101 is configured to use a second transmission mode to send data when it is detected that the first transmission mode cannot be used.

In an embodiment, the first sending module 101 may detect that the first transmission mode cannot be used, for example, a wireless connection failure occurs, when the terminal uses the first transmission mode to send data; or may detect that the first transmission mode cannot be used when the terminal has selected the first transmission mode to send data but has not used the first transmission mode to send data. The situation that a wireless connection failure occurs may be that downlink signal power received by the terminal is very poor (downlink receiving power is lower than a preset threshold, or a physical layer of the terminal reports that a link is out of synchronization, or a timer of the terminal for waiting for recovering of link synchronization is started), or may be that a radio link control (RLC) layer reaches a maximum number of transmission times, or may be that a media access control (Media Access Control, MAC) layer of the terminal reports to a radio resource control (RRC) layer that a random access channel (RACH) has a problem. In addition, detecting that the first transmission mode cannot be used may also be that a cellular uplink resource is not successfully obtained during a process of requesting a first communications resource, for example: the terminal sends a scheduling request (Scheduling Request, SR) multiple times to request a cellular uplink resource, but no cellular uplink resource is available at the base station until the number of transmission times of the SR exceeds dsr-TransMax (maximum number of transmission times for a designated SR). When it is detected that the first transmission mode cannot be used, the transmission mode for sending data is converted, and the second transmission mode is used to send data.

Specifically, transmission mode conversion in a D2D device is taken as an example for illustration. The D2D device is using the first transmission mode to send data; when it is detected that the first transmission mode cannot be used, a RRC layer of the terminal sends an instruction of "stopping first transmission mode of D2D device" (or called primitive) to a MAC layer; the MAC layer sets "D2D TransMode" to the second transmission mode, and stops using the first transmission mode to send the data in the data buffer, and clears an allocation grant of a first communications resource allocated by the base station. The second transmission mode is used to send data, the second transmission mode can be that a terminal selects a second communications resource in the resource pool to send data, or uses an inherent third communications resource to send data. It should be noted that the resource pool here can be configured to the terminal through an information element in a dedicated signaling, for example, RadioResourceConfigDedicated, when the base station configures a D2D resource to the terminal, or may be acquired from broadcast information when the terminal camps on a target cell and be recorded in its own internal storage module.

The second sending module 102 is configured to, when it is detected that the first transmission mode can be used while the second transmission mode is used to send data, stop using the second transmission mode to send data and use the first transmission mode to send data;

The first transmission mode refers to that the apparatus sends data through a first communications resource allocated by the base station, the second transmission mode refers to that the apparatus sends data through a second communications resource selected in a resource pool configured by the base station or the apparatus sends data through an inherent third communications resource.

In an embodiment, the terminal detects whether the first transmission mode can be used during using the second transmission mode to send data, the specific detecting method can be: detecting according to a reason why the first transmission mode cannot be used. For example, when the reason that the first transmission mode cannot be used is a wireless connection failure, the detecting method can be: performing detection of wireless connection status, and determining that the first transmission mode can be used when it is detected that the wireless connection status is well-run, that is, the following two types of messages are not received, which may be 1) a report of out of synchronization or a RACH problem report from the physical layer, 2) a report of reaching a maximum number of transmission times from the RLC layer. If at least one of these two messages is received, the first transmission mode is still determined as being unable to be used.

Furthermore, when it is detected that the first transmission mode can be used, the second sending module 102 stops using the second transmission mode to send data and uses the first transmission mode to send data. Specifically, a method for detecting that the first transmission mode can be used may be that when wireless connection reestablishment is successful, that is, the terminal receives a reestablishment complete message (e.g. RRCconnectionreestablishment message) from the base station, it is determined that the first transmission mode can be used, or may be that the base station allocates the first communications resource through reconfiguration, or may be that the base station allocates a cellular uplink resource according to the scheduling request reported by the terminal etc., and the specific method can be determined according to the detecting method.

Specifically, transmission mode conversion in a D2D device is taken as an example for illustration here. When the D2D device detects that the first transmission mode can be used, a RRC layer sends an instruction of "activating the first transmission mode" to a MAC layer, the MAC layer sets "D2D TransMode" to the first transmission mode after receiving the instruction, and the terminal uses the first transmission mode to send data.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 13:
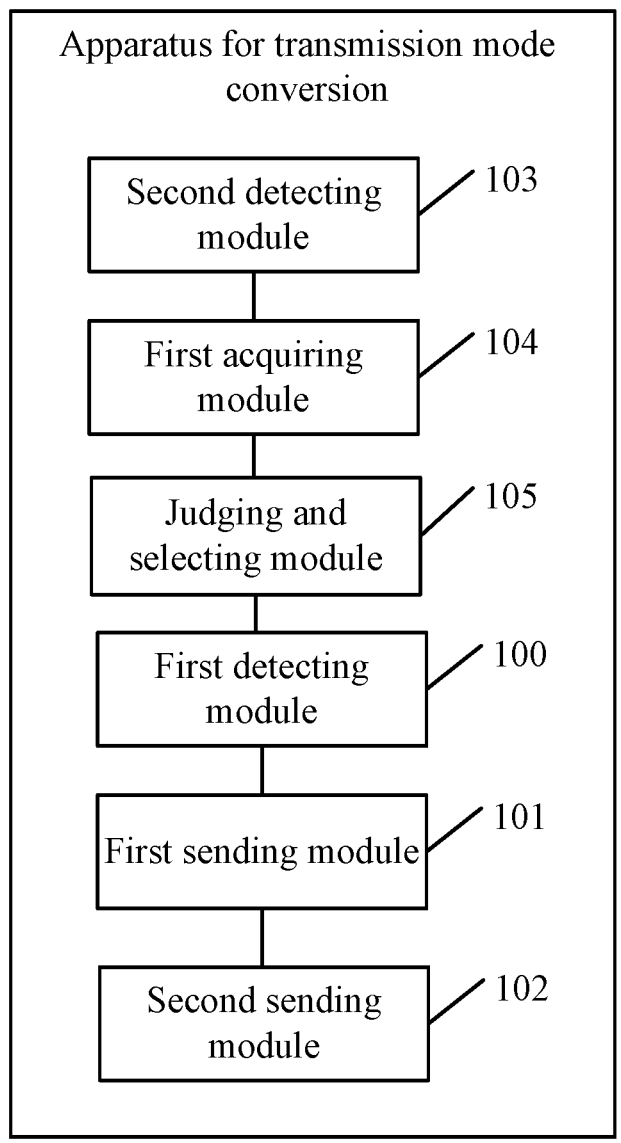
FIG. 13 is a schematic structural diagram of another apparatus for transmission mode conversion provided by the present disclosure.

Please refer to FIG. 13, which is a schematic structural diagram of another apparatus for transmission mode conversion provided by an embodiment of the present disclosure. The apparatus for transmission mode conversion can include: a first detecting module 100, a first sending module 101, a second sending module 102, a second detecting module 103, a first acquiring module 104 and a judging and selecting module 105.

The second detecting module 103 is configured to, when it is detected that the first transmission mode cannot be used, detect whether the apparatus is within network coverage of a base station.

As an alternative implementing manner, when a configuration message sent from base station to the terminal indicates that the first transmission mode cannot be used and the second transmission mode can be used, the second detecting module 103 of the terminal needs to further judge whether the second transmission mode can be used, and firstly the second detecting module 103 needs detect whether the terminal is within the network coverage of the base station.

The first acquiring module 104 is configured to, if the apparatus is not within the network coverage of the base station, acquire the inherent third communications resource of the apparatus.

As an alternative implementing manner, if the terminal is not within the network coverage of the base station, it means that the base station does not configure a resource pool for the terminal, the terminal can only use the second transmission mode to send data through a pre-configured third communications resource and therefore the first acquiring module 104 needs to acquire a pre-configured third communications resource and uses the second transmission mode to send data through the third communications resource.

The selection judging module 105 is configured to, if the apparatus is within the network coverage of the base station, judge whether a using condition of the second communications resource is satisfied, and select the second communications resource in the resource pool pre-allocated by the base station when the using condition of the second communications resource is satisfied.

As an alternative implementing manner, when the terminal is within the network coverage of the base station, which means that the base station may have configured a resource pool for the terminal and the terminal may be able to use the second transmission mode to send data through the second communications resource. Therefore the selecting and judging module 105 further needs to judge whether the terminal satisfies the using condition of the second communications resource, and when the terminal satisfies the using condition of the second communications resource, the terminal performs an action of converting to the second transmission mode, that is, selecting the second communications resource from the resource pool configured by the base station and using the second transmission mode to send data through the second communications resource. If the using condition of the second communications resource is not satisfied, the terminal does not perform transmission mode conversion.

It should be noted that the using condition of the second communication includes any one or both of the following conditions: 1) downlink receiving power of the terminal is lower than a preset threshold; 2) the base station configures a resource pool for the terminal.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 14:
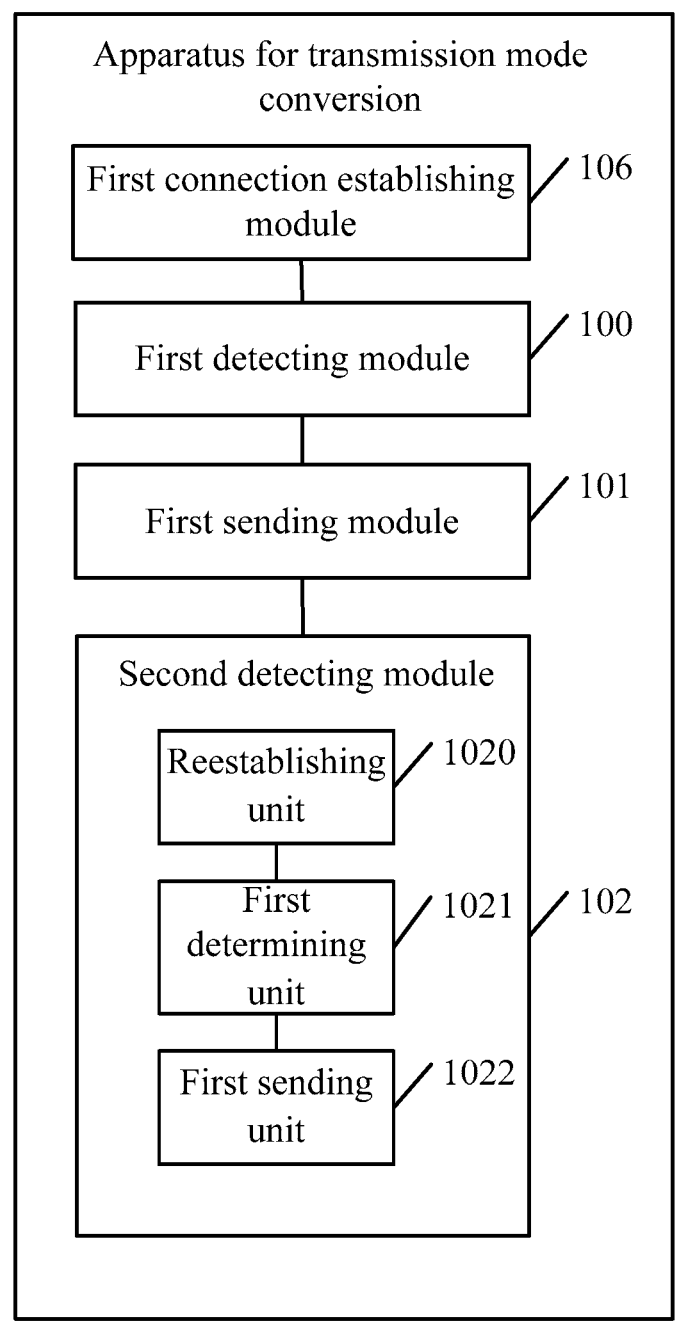
FIG. 14 is a schematic structural diagram of still another apparatus for transmission mode conversion provided by the present disclosure.

Please refer to FIG. 14, which is a schematic structural diagram of still another apparatus for transmission mode conversion provided by an embodiment of the present disclosure. The apparatus for transmission mode conversion can include: a first detecting module 100, a first sending module 101, a second sending module 102 and a first connection establishing module 106, and further the second sending module includes a reestablishing unit 1020, a first determining unit 1021 and a first sending unit 1022.

The first connection establishing module 106 is configured to establish a wireless connection with the base station, acquire the first communications resource allocated by the base station and use the first transmission mode to send data through the first communications resource.

As an alternative implementing manner, when the terminal needs to send data, the first connection establishing module 106 will firstly establish a wireless connection with a base station, the base station will allocate a first communications resource according to an actual condition of the terminal, the terminal acquires the allocated first communications resource from the base station using the established wireless connection and uses the first transmission mode to send data. It should be noted that the first transmission mode refers to sending data through the first communications resource.

Transmission mode conversion in a D2D device is taken as an example for illustration here. After the D2D device camps on an appropriate cell, when it finds that its D2D module has data to send, it will firstly initiate a connection establishment request used to establish a wireless connection, according to an instruction of "D2D communication permitted" broadcasted by the base station, where the request message carries an establishment cause of "D2D communication request". After the base station responds to the request and establishes the wireless connection (i.e. receiving RRCconnectionSetup), an RRC layer will instruct a MAC layer to configured "D2D TransMode" to the first transmission mode, and at this time the terminal will report its own D2D buffering status to the base station, the base station will allocate the first communications resource, i.e. a D2D communications resource, according to the size of the D2D communication data buffer, the terminal acquires the first communications resource allocated by the base station and sends data on the first communications resource allocated by the base station, that is, using the first transmission mode to send data.

The reestablishing unit 1020 is configured to perform wireless connection reestablishment with the base station while the apparatus uses the second transmission mode to send data.

As an alternative implementing manner, when a wireless connection failure is detected, the reestablishing unit 1020 continues reestablishing a wireless connection while the terminal is using the second transmission mode to send data.

The first determining unit 1021 is configured to, when the wireless connection reestablishment is successful, determine that the first transmission mode can be used.

As an alternative implementing manner, during performing wireless connection reestablishment, the terminal receives a wireless connection reestablishment successful message sent from the base station, which means that the wireless connection reestablishment is successful, and the terminal requests the base station to allocate a first communications resource, and when the terminal acquires the first communications resource allocated by the base station, the first determining unit 1021 determines that the first transmission mode can be used.

The first sending unit 1022 is configured to stop using the second transmission mode to send data and use the first transmission mode to send data.

As an alternative implementing manner, the first sending unit 1022 of the terminal stops using the second transmission mode to send data, and uses the first transmission mode to send data. Taking a D2D device as an example for illustration here, an RRC layer in the D2D device sends an instruction to a MAC layer to instruct the MAC layer to use the first transmission mode. After receiving the instruction, the MAC layer sets "D2D TransMode" to the first transmission mode. At the same time, the MAC layer stops using the second transmission mode to send data.

In the embodiment of the present disclosure, when it is detected that the first transmission mode for sending data cannot be used, the second transmission mode is used to send data, and when the first transmission mode can be used, the using of the second transmission mode is stopped and the first transmission mode is used to send data. In this embodiment, constant conversions between the first transmission mode and the second transmission mode can avoid a situation of communications interruption when a currently-used transmission mode cannot be used, and the method is practical.

Figure 15:
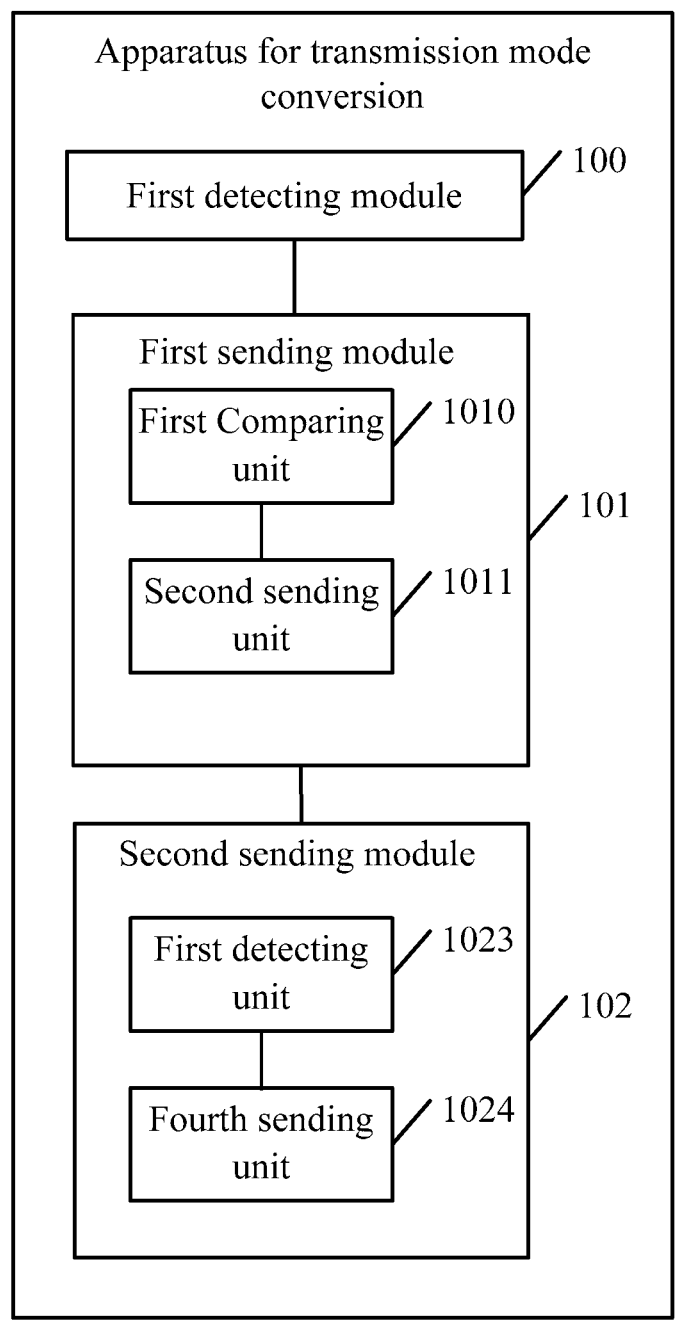
FIG. 15 is a schematic structural diagram of still another apparatus for transmission mode conversion provided by the present disclosure.

Please refer to FIG. 15, which is a schematic structural diagram of still another apparatus for transmission mode conversion provided by an embodiment of the present disclosure. The apparatus for transmission mode conversion can include: a first detecting module 100, a first sending module 101, a second sending module 102, and further, the first sending module includes a first comparing unit 1010 and a second sending unit 1011, and the second sending module includes a first detecting unit 1023 and a fourth sending unit 1024.

The first comparing unit 1010 is configured to, when it is detected that the base station returns a reject message rejecting establishment of a wireless connection and the reject message carries a wait time, compare the wait time and a second preset time.

As an alternative implementing manner, when receiving a connection establishment request sent the a terminal, the base station rejects establishment of a wireless connection, and returns a reject message rejecting the establishment of the wireless connection, that is, returning an RRCconnectionReject message, where the message carries a wait time, i.e. "waittime" or "extendwaittimer", or the RRCconnectionReject message carries a wait time of the first transmission mode, i.e. "Mode1-waittimer", and furthermore, the reject message may further carries a reject reason, such as "suggest using the second transmission mode". When the terminal receives the reject message, the first comparing unit 1010 compares the wait time in the reject message and a second preset time. It should be noted that the second preset time can be configured by the base station to the terminal, or can be carried in a broadcast message of the base station.

The second sending unit 1011 is configured to, if the wait time is larger than the second preset time, determine that the first transmission mode cannot be used, and use the second transmission mode to send data after the second preset time.

As an alternative implementing manner, if the wait time returned by the base station is larger than the second preset time, that is, the terminal still cannot establish a wireless connection with the base station after waiting for the second preset time, the second sending unit 1011 determines that the first transmission mode cannot be used, and the terminal uses the second transmission mode to send data after the second preset time. It should be noted that using the second transmission mode to send data can be: the terminal selects a second communications resource which is suitable for the terminal from the resource pool and uses the second communications resource to send data. The resource pool here can be configured to the terminal through an information element in a dedicated signaling, for example, RadioResourceConfigDedicated, when the base station configures a resource to the terminal, or can be acquired from the broadcast information when the terminal camps on the target cell and be recorded in its own internal storage module.

Specifically, the D2D device is taken as an example for illustration here. After the D2D device receives the reject message, and the wait time is larger than the second preset time, an RRC layer of the D2D device sends an instruction of "stopping the first transmission mode of the D2D device" (or called primitive) to a MAC layer, the MAC layer sets "D2D TransMode" to the second transmission mode, and stops sending data in the data buffer, and clears an allocation grant of the first communications resource allocated by the base station (an action can be: to set the grant as disable). The D2D device starts a timer T350, where the time length of T350 is the second preset time, and at the same time, also starts a timer (such as T302) corresponding to the waittimer, where the time length of T302 is the wait time; if the waittimer of the terminal still keeps running after T350 expires, the RRC layer of the D2D device notifies the MAC layer of using the second transmission mode to send data.

The first detecting unit 1023 is configured to detect whether the wait time expires while the apparatus uses the second transmission mode to send data.

As an alternative implementing manner, the first detecting unit 1023 detects whether the wait time expires in real time while the terminal uses the second transmission mode to send data. Specifically, taking a D2D device as an example for illustration again, whether the timer T302 corresponding to the wait timer expires is detected in real time.

The fourth sending unit 1024 is configured to, when it is detected that the wait time expires, stop using the second transmission mode to send data, and use the first transmission mode to send data.

As an alternative implementing manner, when it is detected that the wait time expires, which means the wait time of the first transmission mode expires, the fourth sending unit 1024 stops using the second transmission mode to send data and uses the first transmission mode to send data. It should be noted that the stop using the second transmission mode to send data here can be: immediately stopping using the second transmission mode to send data when the wait time expires, or can be: after detecting that the wait time expires, starting a wireless connection establishment process, and preparing to acquire a first communications resource, using the second transmission mode until the wireless link is established successfully, and stopping using the second transmission mode to send data after the wireless link is established successfully, and using the first transmission mode to send data.

Specifically, the D2D device is taken as an example for illustration here. When receiving a reject message, the D2D device can set the time length of the timer T302 or T351 to the wait time, and when detecting that the timer expires, the D2D device initiates a wireless connection establishment process, that is, sending "RRCconnectionSetupRequest", and when the D2D device receives an "RRCconnectionSetup" message from the base station, the RRC layer sends an instruction of "activating the first transmission mode" to the MAC layer. The MAC layer sets "D2D TransMode" to the first transmission mode after receiving the instruction, and the D2D device uses the first transmission mode to send data and stops using the second transmission mode to send data.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 16:
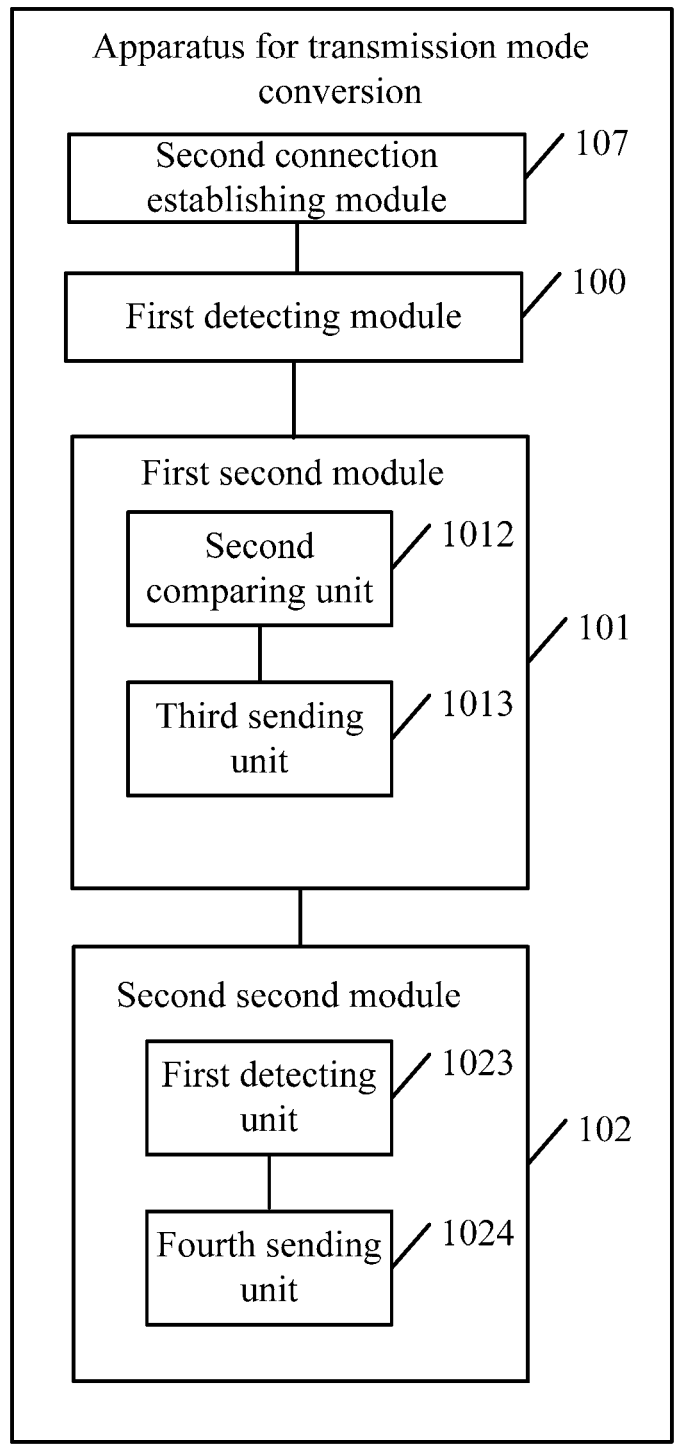
FIG. 16 is a schematic structural diagram of still another apparatus for transmission mode conversion provided by the present disclosure.

Please refer to FIG. 16, which is a schematic structural diagram of still another apparatus for transmission mode conversion provided by an embodiment of the present disclosure. The apparatus for transmission mode conversion can include: a first detecting module 100, a first sending module 101, a second sending module 102 and a second connection establishing module 107, and further, the first sending module includes a second comparing unit 1012 and a third sending unit 1013, and the second sending module includes a first detecting unit 1023 and a fourth sending unit 1024.

The second connection establishing module 107 is configured to establish a wireless connection with the base station, acquire the first communications resource allocated by the base station, and use the first transmission mode to send data through the first communications resource.

As an alternative implementing manner, when the terminal needs to send data, the second connection establishing module 107 will establish a wireless connection with the base station first, the base station will allocate a first communications resource according to an actual condition of the terminal, the terminal acquires the allocated first communications resource from the base station by using the established wireless connection, and uses the first transmission mode to send data. It should be noted that the first transmission mode refers to sending data through the first communications resource.

Transmission mode conversion in a D2D device is taken as an example for illustration here. After the D2D device camps on an appropriate cell, when the D2D device finds that its D2D module has data to send, it will first initiate a connection establishment request used to establish a wireless connection, according to an instruction of "D2D communication permitted" broadcasted by the base station, where the request message carries an establishment cause of "D2D communication request". After the base station responds to the request and establishes the wireless connection (i.e. receiving RRCconnectionSetup), an RRC layer will instruct a MAC layer to set "D2D TransMode" to the first transmission mode, and at this time the terminal will report its own D2D buffering status to the base station, the base station will allocate the first communications resource, i.e. a D2D communications resource, according to the size of the D2D communication data buffer, and the terminal acquires the first communications resource allocated by the base station and sends data on the first communications resource allocated by the base station, that is, using the first transmission mode to send data.

The second comparing unit 1012 is configured to, when receiving a resource release message sent from the base station and the resource release message includes the wait time, compare the wait time and a third preset time.

As an alternative implementing manner, when using the first transmission mode to send data through the first communications resource, the terminal receives a resource release message sent by the base station, where the resource release message carries the wait time, which means that during the wait time the base station is to release the first communications resource allocated for the terminal and the terminal cannot use the first communications resource to send data. The second comparing unit 1012 compares the wait time with the third preset time. It should be noted that the third preset time can be configured by the base station to the terminal, or can be carried in a broadcast message of the base station.

Specifically, taking a D2D device as an example for illustration here, the D2D device receives a resource release message, i.e. an RRCconnectionRelease message, sent by a base station, and the message carries the wait time, i.e. "waittime" or "Mode1-waittimer", and further, the message may also carry a release reason such as "use the second transmission mode"; the D2D device compares the wait time and the third preset time.

The third sending unit 1013 is configured to, if the wait time is larger than the third preset time, determine that the first transmission mode cannot be used, and use the second transmission mode to send data.

As an alternative implementing manner, if the wait time is larger than the third preset time, that is, the terminal still cannot establish a wireless connection with the base station after the third preset time, the third sending unit 1013 determines that the first transmission mode cannot be used, the terminal uses the second transmission mode to send data after the third preset time. It should be noted that using the second transmission mode to send data can be: the terminal selects a second communications resource which is suitable for the terminal from a resource pool, and use the second communications resource to send data. The resource pool here can be configured to the terminal through an information element in a dedicated signaling, for example, RadioResourceConfigDedicated, when the base station configures a resource to the terminal, or can be acquired from broadcast information when the terminal camps on the target cell and be recorded in its own internal storage module.

Specifically, the D2D device is taken as an example for illustration here. After the D2D device receives the resource release message, where the wait time is larger than the third preset time, the RRC layer of the D2D device sends an instruction of "stopping the first transmission mode of the D2D device" (or called primitive) to the MAC layer, the MAC layer configures "D2D TransMode" to the second transmission mode, and stops sending data in the data buffer, and clears an allocation grant of the first communications resource allocated by the base station (an action may be setting the grant as disable). The D2D device starts a timer T350, where the time length of T350 is the third preset time, and also starts a timer (such as T302) corresponding to the wait timer at the same time, where the time length of T302 is the wait time; if the wait timer of the terminal still keeps running after T350 expires, the RRC layer of the D2D device notifies the MAC layer of activating the second transmission mode, i.e. to use the second transmission mode to send data.

In the embodiments of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid the situation of communications interruption when a currently-used transmission mode cannot be used, and the method is practical.

Figure 17:
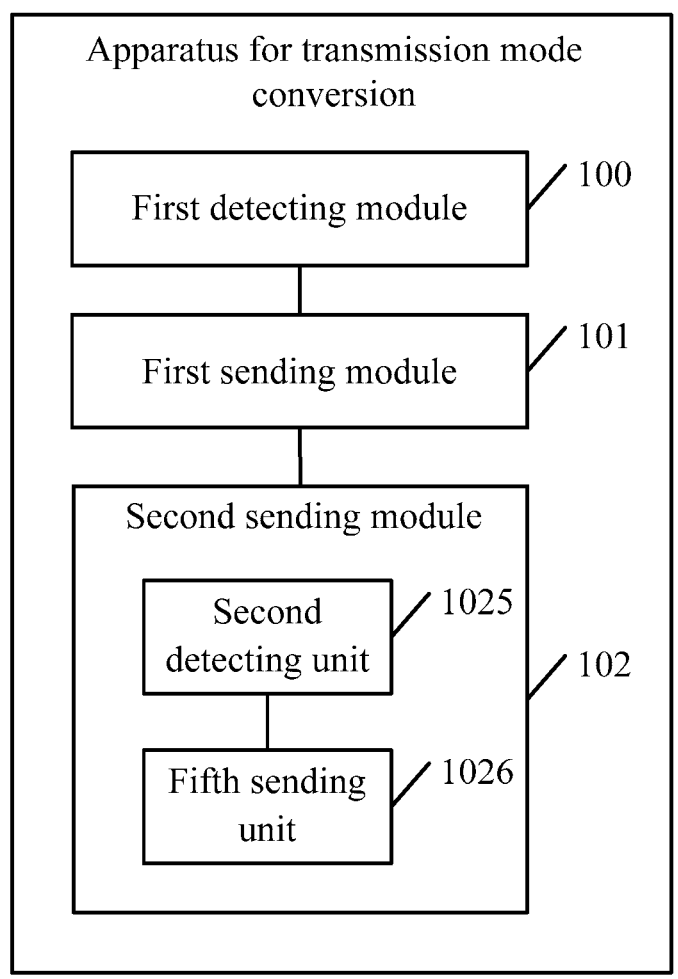
FIG. 17 is a schematic structural diagram of still another apparatus for transmission mode conversion provided by the present disclosure.

Please refer to FIG. 17, which is a schematic structural diagram of still another apparatus for transmission mode conversion provided by an embodiment of the present disclosure. The apparatus for transmission mode conversion can include: a first detecting module 100, a first sending module 101 and a second sending module 102, and further, the second sending module includes a second detecting unit 1025 and a fifth sending unit 1026.

The second detecting unit 1025 is configured to, while the apparatus uses the second transmission mode to send data, detect whether the base station allocates a cellular uplink resource for the terminal through reconfiguration.

As an alternative implementing manner, the second detecting unit 1025 detects in real time whether the base station allocates the cellular uplink resource for the terminal through reconfiguration.

The fifth sending unit 1026 is configured to, when it is detected that the base station allocates the cellular uplink resource for the apparatus through the reconfiguration, stop using the second transmission mode to send data and use the first transmission mode to send data.

As an alternative implementing manner, when it is detected that the base station allocates the cellular uplink resource for the terminal through reconfiguration, the fifth sending unit 1026 stops using the second transmission mode to send data and uses the first transmission mode to send data.

Specifically, a D2D device is taken as an example for illustration here. When acquiring a cellular uplink resource allocated by the base station through reconfiguration, the D2D device sets "D2D TransMode" to the first transmission mode, stops using the second transmission mode to send data, and uses the first transmission mode to send data.

Furthermore, if the wireless connection is released, and the D2D device returns to an idle state, the transmission mode needs to be re-selected according to a broadcast message of the base station.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 18:
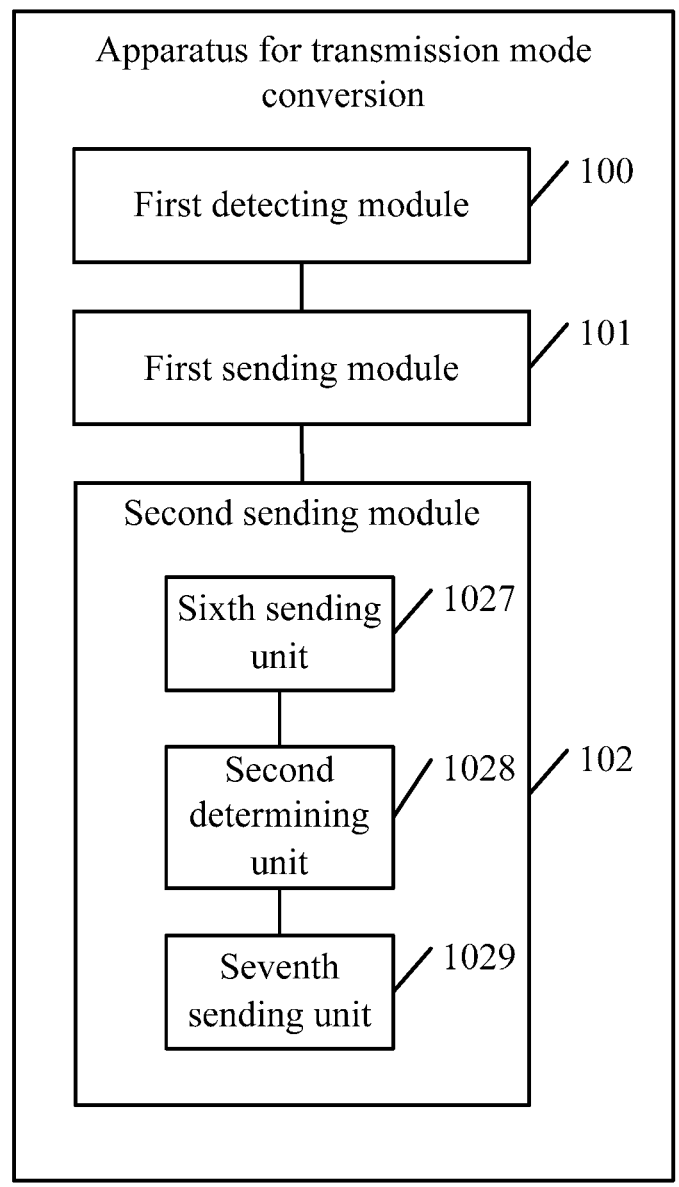
FIG. 18 is a schematic structural diagram of still another apparatus for transmission mode conversion provided by the present disclosure.

Please refer to FIG. 18, which is a schematic structural diagram of still another apparatus for transmission mode conversion provided by an embodiment of the present disclosure. The apparatus for transmission mode conversion can include: a first detecting module 100, a first sending module 101 and a second sending module 102, and further, the second sending module includes a sixth sending unit 1027, a second determining unit 1028 and a seventh sending unit 1029.

The sixth sending unit 1027 is configured to continue sending the wireless connection request to the base station while the apparatus uses the second transmission mode to send data.

As an alternative implementing manner, while the terminal uses the second transmission mode to send data, the sixth sending unit 1027 still continues sending the connection establishment request to the base station, i.e. continuing trying to establish a wireless connection.

Specifically, a D2D device is taken as an example for illustration here. The terminal continues trying to establish a wireless connection, and at the same time starts a timer T351; when T351 expires, if the D2D device still continues trying to establish a wireless connection, T351 is started. If the terminal has stopped the wireless connection establishment process, wireless connection establishment is re-initiated.

The second determining unit 1028 is configured to, when the wireless connection is established successfully and the base station allocates the first communications resource for the terminal, determine that the first transmission mode can be used.

As an alternative implementing manner, during a process of trying to establish a wireless connection, the wireless connection is established successfully, and the base station allocates the first communications resource for the terminal, the second determining unit 1028 determines that the first transmission mode can be used.

The seventh sending unit 1029 is configured to stop using the second transmission mode to send data and use the first transmission mode to send data.

As an alternative implementing manner, when it is determined that the first transmission mode can be used, the seventh sending unit 1029 sets "D2D TransMode" to the first transmission mode, stops using the second transmission mode to send data, and uses the first transmission mode to send data.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data.

In this embodiment, constant conversions between the first transmission mode and the second transmission mode can avoid a situation of communications interruption when a currently-used transmission mode cannot be used, and the method is practical.

Figure 19:
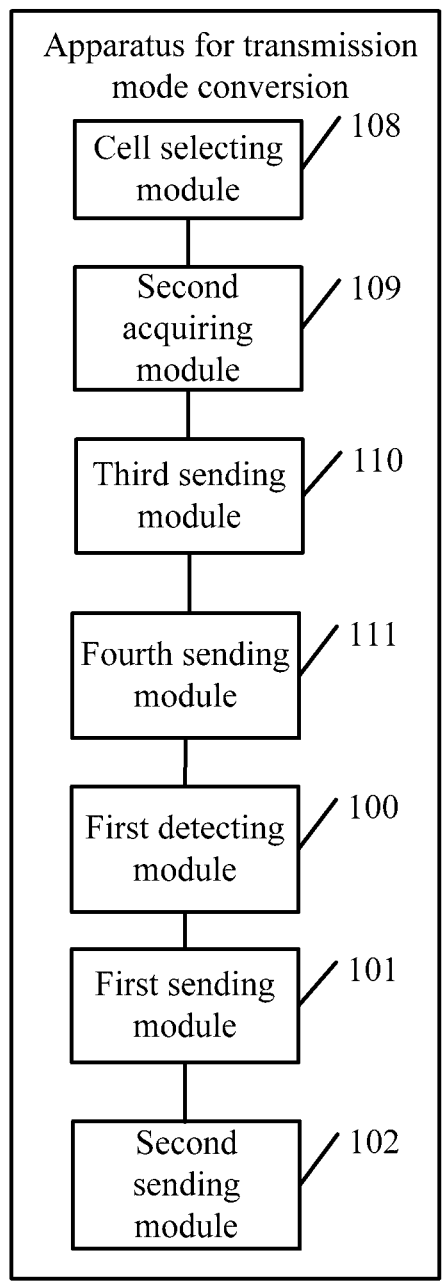
FIG. 19 is a schematic structural diagram of still another apparatus for transmission mode conversion provided by the present disclosure.

Please refer to FIG. 19, which is a schematic structural diagram of still another apparatus for transmission mode conversion provided by an embodiment of the present disclosure. The apparatus for transmission mode conversion can include: a first detecting module 100, a first sending module 101, a second sending module 102, a cell selecting module 108, a second acquiring module 109, a third sending module 110 and a fourth sending module 111.

The cell selecting module 108 is configured to perform cell selection.

As an alternative implementing manner, when the terminal needs to send data, the cell selecting module 108 needs to perform cell selection, and perform transmission mode selection according to a broadcast message of a base station of a cell on which the terminal camps.

The second acquiring module 109 is configured to, when it is detected that the terminal camps on a target cell, acquire the broadcast message sent by the base station, where the broadcast message includes a selecting condition used to instruct the apparatus to perform the transmission mode selection, where the target cell belongs to the base station.

As an alternative implementing manner, when it is detected that the terminal camps on the target cell, the second acquiring module 109 acquires a broadcast message sent by the base station, where the broadcast message includes a selecting condition used to instruct the terminal to perform the transmission mode selection. It should be noted that the target cell belongs to the base station.

Specifically, a D2D device is taken as an example for illustration here. The D2D device acquires from the broadcast message a D2D device transmission mode configuration message for performing mode selection, where the configuration message includes a selecting condition for the terminal to select a transmission mode.

The third sending module 110 is configured to, when the selecting condition satisfies a selecting condition of the first transmission mode, establish a wireless connection with the base station, and acquire the first communications resource allocated by the base station, and use the first transmission mode to send data.

As an alternative implementing manner, when the selecting condition in the broadcast message satisfies a selecting condition of the first transmission mode, the third sending module 110 establishes a wireless connection with the base station, acquires the first communications resource allocated by the base station and uses the first transmission mode to send data through the first communications resource.

The selecting condition of the first transmission mode includes any one of the following conditions:

A. The resource pool is not notified in the selecting condition.

Specifically, taking the D2D device as an example for illustration here. Relevant information of the resource pool for sending data is not notified by the selecting condition in the broadcast message, for example, if the broadcast message includes any one of the following information, only the first transmission mode can be used: 1) only notifying the D2D device of a D2D receiving resource collection of the target cell; 2) only notifying the D2D device that the target cell permits using D2D to send data; 3) only notifying the D2D device that a wireless connection should be established if D2D transmission is desired.

B. The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor.

Specifically, the D2D device is taken as an example for illustration here. The selecting condition in the broadcast message notifies relevant information of the resource pool, which means that the first transmission mode and the second transmission mode both can be used, and it needs further to be determined which transmission mode needs be used, according to the random seed and the scale factor in the selecting condition. The further determining method is: the terminal inputs the random seed as an initial condition into the preset probability density function, acquires a random number, and compares the random number with the scale factor, and if the random number is larger than the scale factor in the selecting condition, the terminal uses the first transmission mode to send data. The scale factor is a threshold for comparison.

C. The resource pool is notified in the selecting condition, and the selecting condition includes a threshold of downlink receiving power for using the first transmission mode, the downlink receiving power of the base station is measured, and the downlink receiving power is larger than the threshold of the downlink receiving power.

Specifically, the selecting condition in the broadcast message notifies relevant information of the resource pool, which means that the first transmission mode and the second transmission mode both can be used and it needs to be further determined which transmission mode is to be used according to the threshold of the downlink receiving power in the selecting condition. The further determining method can be: measuring receiving power of a downlink pilot or a synchronization signal of the base station, and if the downlink receiving power is larger than the threshold of the downlink receiving power, using the first transmission mode to send data.

D. The resource pool is notified in the selecting condition, and the selecting condition includes a load threshold of the resource pool, the resource pool includes at least one second communications resource, and the number of the occupied second communications resource in the resource pool exceeds the load threshold.

Specifically, the selecting condition in the broadcast message notifies relevant information of the resource pool, which means that the first transmission mode and the second transmission mode both can be used and it needs to be further determined which transmission mode is to be used according to the load threshold of the resource pool in the selecting condition. There are multiple second communications resources in the resource pool. The further determining method can be: the D2D device detects signal power received on each second communications resource in the resource pool, and when the signal power can be received on a second communications resource, it means that the second communications resource is occupied, and when the number of the occupied second communications resource in the resource pool exceeds the load threshold, i.e. the ratio of the busy second communications resource in the resource pool exceeds the load threshold, the D2D device uses the first transmission mode.

The fourth sending module 111 is configured to, when the selecting condition satisfies a selecting condition of the second transmission mode, use the second transmission mode to send data.

As an alternative implementing manner, when the selecting condition in the broadcast message satisfies a selecting condition of the second transmission mode, the fourth sending module 111 uses the second transmission mode to send data.

The selecting condition of the second transmission mode includes any one of the following conditions:

A. The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is smaller than the scale factor.

Specifically, the D2D device is taken as an example for illustration here. The selecting condition in the broadcast message notifies relevant information of the resource pool, which means that the first transmission mode and the second transmission mode both can be used and it needs to be further determined which transmission mode needs be used according to the random seed and the scale factor in the selecting condition. The further determining method is: the terminal inputs the random seed as an initial condition into the preset probability density function, acquires a random number, and compares the random number with the scale factor; if the random number is smaller than the scale factor in the selecting condition, the terminal uses the second transmission mode to send data. The scale factor is a threshold for comparison.

B. The resource pool is notified in the selecting condition, and the selecting condition includes a threshold of downlink receiving power for using the first transmission mode, the downlink receiving power of the base station is measured, and the downlink receiving power is smaller than the threshold of the downlink receiving power.

Specifically, the selecting condition in the broadcast message notifies relevant information of the resource pool, which means that the first transmission mode and the second transmission mode both can be used and it needs to be further determined which transmission mode is to be used according to the threshold of the downlink receiving power in the selecting condition. The further determining method can be: measuring receiving power of a downlink pilot or a synchronizing signal of the base station, and if the downlink receiving power is smaller than the threshold of the downlink receiving power, using the second transmission mode to send data.

C. The resource pool is notified in the selecting condition, and the selecting condition includes a load threshold of the resource pool, the resource pool includes at least one second communications resource, and the number of the occupied second communications resource in the resource pool is smaller than the load threshold.

Specifically, the selecting condition in the broadcast message notifies relevant information of the resource pool, which means that the first transmission mode and the second transmission mode both can be used, and it needs to be further determined which transmission mode is to be used according to the load threshold of the resource pool in the selecting condition. There are multiple second communications resources in the resource pool. The further determining method can be: the D2D device detects signal power received on each second communications resource in the resource pool, and when the signal power can be received on a second communications resource, it means that the second communications resource is occupied, and when the number of the occupied second communications resource in the resource pool is smaller than the load threshold, i.e. the ratio of the busy second communications resource in the resource pool is smaller than the load threshold, the D2D device uses the second transmission mode.

In the embodiment of the present disclosure, when it is detected that the first transmission mode for sending data cannot be used, the second transmission mode is used to send data, and when the first transmission mode can be used, the using of the second transmission mode to send data is stopped and the first transmission mode is used to send data. In this embodiment, constant conversions between the first transmission mode and the second transmission mode can avoid a situation of communications interruption when a currently-used transmission mode cannot be used, and the method is practical.

Figure 20:
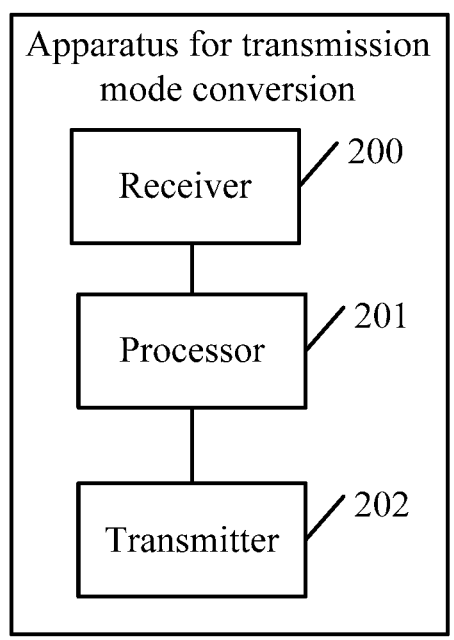
FIG. 20 is a schematic structural diagram of still another apparatus for transmission mode conversion provided by the present disclosure.

Please refer to FIG. 20, which is a schematic structural diagram of still another apparatus for transmission mode conversion provided by an embodiment of the present disclosure. The apparatus for processing data can include: a receiver 200, a processor 201 and a transmitter 202.

The processor is configured to detect whether a first transmission mode for sending data can be used.

Alternatively, the terminal detecting whether a first transmission mode for sending data can be used, may be: continuously detecting whether the first transmission mode can be used during using the first transmission mode, or may be: detecting whether the first transmission mode can be used when establishing a wireless connection with a base station for the first time. The specific detecting method may be: sending a connection establishment request to the base station, or may be detecting whether the established wireless connection is failed, or may be detecting whether a resource release message is received, etc.

The transmitter is configured to use a second transmission mode to send data when it is detected that the first transmission mode cannot be used.

Alternatively, the terminal may detect that the first transmission mode cannot be used, for example, a wireless connection failure occurs, when using the first transmission mode to send data; or may detect that the first transmission mode cannot be used when the terminal has selected the first transmission mode to send data but has not used the first transmission mode to send data. The situation that a wireless connection failure occurs may be that downlink signal power received by the terminal is very poor (downlink receiving power is lower than a preset threshold, or a physical layer of the terminal reports that a link is out of synchronization, or a timer of the terminal for waiting for recovering of link synchronization is started), or may be that a radio link control (RLC) layer reaches a maximum number of transmission times, or may be that a media access control (MAC) layer of the terminal reports to a radio resource control (RRC) layer that a random access channel (RACH) has a problem. In addition, detecting that the first transmission mode cannot be used may also be that a cellular uplink resource is not successfully obtained during a process of requesting a first communications resource, for example: the terminal sends a scheduling request (SR) multiple times to request a cellular uplink resource, but no cellular uplink resource is available at the base station until the number of transmission times of the SR exceeds dsr-TransMax (maximum number of transmission times for a designated SR).

When it is detected that the first transmission mode cannot be used, the transmission mode for sending data is converted, and the second transmission mode is used to send data.

The transmitter is further configured to, when it is detected that the first transmission mode can be used while using the second transmission mode to send data, stop using the second transmission mode to send data and use the first transmission mode to send data.

Alternatively, when it is detected that the first transmission mode can be used, the using of the second transmission mode to send data is stopped and the first transmission mode is used to send data. Specifically, a method for detecting that the first transmission mode can be used may be that when wireless connection establishment is successful, that is, the terminal receives a reestablishment complete message (e.g. RRCconnectionreestablishment message) from the base station, it is determined that the first transmission mode can be used, or may be that the base station allocates a first communications resource through reconfiguration, or may be that the base station allocates a cellular uplink resource according to the scheduling request reported by the terminal and etc., and the specific method can be determined according to the detecting method.

The transmitter is further configured to, when the first communications resource cannot be acquired from the base station, determine that the first transmission mode cannot be used, and use the second transmission mode to send data; or, The transmitter is further configured to, when the first communications resource acquired from the base station cannot be used, determine that the first transmission mode cannot be used, and use the second transmission mode to send data.

The processor is further configured to, when it is detected that the first transmission mode for sending data cannot be used, detect whether the apparatus is within network coverage of the base station.

Alternatively, when a configuration message sent from the base station to the terminal indicates that the first transmission mode cannot be used and the second transmission mode can be used, the terminal needs to further judge whether the second transmission mode can be used, and firstly needs to detect whether the terminal is within the network coverage of the base station.

The processor is further configured to, if the apparatus is not within the network coverage of the base station, acquire an inherent third communications resource of the apparatus.

Alternatively, if the terminal is not within the network coverage of the base station, it means that the base station does not configured a resource pool for the terminal, the terminal can only use the second transmission mode to send data through a pre-configured third communications resource and therefore needs to acquire the pre-configured third communications resource, and uses the second transmission mode to send data through the third communications resource.

The transmitter is further configured to use the second transmission mode to send data through the third communications resource.

The processor is further configured to, if the apparatus is within the network coverage of the base station, judge whether a using condition of the second communications resource is satisfied, and select the second communications resource in the resource pool pre-allocated by the base station when the terminal satisfies the using condition of the second communications resource.

When the terminal is within the network coverage of the base station, it means that the base station may have configured a resource pool for the terminal, and the terminal may use the second transmission mode to send data through a second communications resource. Therefore, it needs to be further judged whether the terminal satisfies the using condition of the second communications resource, and when the terminal satisfies the using condition of the second communications resource, the terminal performs an action of converting to the second transmission mode, that is, selecting a second communications resource from the resource pool configured by the base station and using the second transmission mode to send data through the second communications resource. If the using condition of the second communications resource is not satisfied, the terminal does not perform transmission mode conversion.

The transmitter is further configured to use the second transmission mode to send data through the second communications resource.

Here, the using condition of the second transmission mode includes at least one of the following conditions:

downlink receiving power of the apparatus is lower than a preset threshold;

the base station pre-allocates the resource pool for the apparatus.

The transmitter is further configured to establish a wireless connection with the base station, acquire the first communications resource allocated by the base station, and use the first transmission mode to send data through the first communications resource.

The transmitter is further configured to, when it is detected that the wireless connection fails, determine that the first transmission mode cannot be used, and stop using the first transmission mode to send data, and use the second transmission mode to send data; or, The transmitter is further configured to, when detecting that the wireless connection fails, determine that the first transmission mode cannot be used, and stop using the first transmission mode to send data, and use the second transmission mode to send data after a first preset time.

Alternatively, the first preset time can be configured to the terminal by the base station after a wireless connection is established between the terminal and the base station, or can be carried in a broadcast message of the base station. The configuration of the first preset time can balance the number of terminals which are converted to the second transmission mode, and can prevent that too many terminals from convert to the second transmission mode when a plurality of terminals are concentrated at the edge of the cell, and thus avoid sudden increase of a collision rate of the second communications resource of the second transmission mode.

The processor is further configured to perform wireless connection reestablishment with the base station while the apparatus uses the second transmission mode to send data.

The processor is further configured to, when the wireless connection reestablishment is successful, determine that the first transmission mode can be used.

The transmitter is further configured to stop using the second transmission mode to send data, and use the first transmission mode to send data.

The processor is further configured to, when detecting that the base station returns a reject message rejecting establishment of a wireless connection and the reject message carries a wait time, compare the wait time and the second preset time.

Alternatively, when receiving a connection establishment request sent by the terminal, the base station rejects establishment of a wireless connection, returns a reject message rejecting establishment of the wireless connection, that is, returns an RRCconnectionReject message, where the message carries a wait time, i.e. "waittime" or "extendwaittimer", or the RRCconnectionReject message carries a wait time of the first transmission mode, i.e. "Mode1-waittimer", furthermore, the reject message can further carries a reject reason, such as "suggest using the second transmission mode". When the terminal receives the reject message, it compares the wait time in the reject message and the second preset time. It should be noted that the second preset time can be configured by the base station to the terminal, and can also be carried in a broadcast message of the base station.

The transmitter is further configured to, if the wait time is larger than the second preset time, determine that the first transmission mode cannot be used, and use the second transmission mode to send data after the second preset time.

Alternatively, if the wait time returned by the base station is larger than the second preset time, that is, the terminal still cannot establish a wireless connection with the base station after the second preset time, it is determined that the first transmission mode cannot be used, the terminal uses the second transmission mode to send data after the second preset time. It should be noted that using the second transmission mode to send data can be: the terminal selects a second communications resource which is suitable for the terminal from the resource pool and uses the second communications resource to send data. The resource pool here can be configured to the terminal through an information element in a dedicated signaling, for example, RadioResourceConfigDedicated, when the base station configures a resource for the terminal. or can be acquired from the broadcast information when the terminal camps on a target cell and be recorded in its own internal storage module.

The transmitter is further configured to establish a wireless connection with the base station, acquire the first communications resource allocated by the base station, and use the first transmission mode to send data through the first communications resource.

The processor is further configured to, when a resource release message sent from the base station is received and the resource release message includes a wait time, compare the wait time and a third preset time.

Alternatively, when using the first transmission mode to send data through the first communications resource, the terminal receives a resource release message sent by the base station, and the resource release message carries a wait time, that is, during the wait time, the base station is to release the first communications resource allocated for the terminal and the terminal cannot use the first communications resource to send data. The terminal compares the wait time with a third preset time. It should be noted that the third preset time can be configured by the base station to the terminal, and also can be carried in a broadcast message of the base station.

The transmitter is further configured to, if the wait time is larger than the third preset time, determine that the first transmission mode cannot be used, and use the second transmission mode to send data after the third preset time.

The processor is further configured to detect whether the wait time expires while the apparatus uses the second transmission mode to send data.

The transmitter is further configured to, when it is detected that the wait time expires, stop using the second transmission mode to send data, and use the first transmission mode to send data.

The transmitter is further configured to establish a wireless connection with the base station, and send a scheduling request to the base station, where the scheduling request is used to request allocation of a cellular uplink resource.

Alternatively, after establishing the wireless connection with the base station, the terminal sends a scheduling request (SR), which is used to request allocation of a cellular uplink resource, to the base station.

The transmitter is further configured to, when the number of transmission times of the scheduling request exceeds a preset number of times and the base station does not allocate the cellular uplink resource, determine that the first transmission mode cannot be used, and use the second transmission mode to send data.

Alternatively, when the number of transmission times of the scheduling request exceeds a preset number of times, and the base station does not allocate the cellular uplink resource, it is determined that the first transmission mode cannot be used, and the second transmission mode is used to send data.

The processor is further configured to, while the apparatus uses the second transmission mode to send data, detect whether the base station allocates the cellular uplink resource for the terminal through reconfiguration.

The transmitter is further configured to, when it is detected that the base station allocates the cellular uplink resource for the apparatus through the reconfiguration, stop using the second transmission mode to send data, and use the first transmission mode to send data.

The transmitter is further configured to send a connection establishment request to the base station, where the connection establishment request is used to establish a wireless connection.

The transmitter is further configured to, when the number of transmission times of the connection establishment request exceeds a preset number of times, and no response message sent by the base station is received, determine that the first transmission mode cannot be used, and use the second transmission mode to send data.

The transmitter is further configured to continue sending the wireless connection request to the base station while the apparatus uses the second transmission mode to send data.

The processor is further configured to, when the wireless connection is established successfully, and the base station allocates the first communications resource for the terminal, determine that the first transmission mode can be used.

The transmitter is further configured to stop using the second transmission mode to send data, and use the first transmission mode to send data.

The processor is further configured to perform cell selection.

The receiver is configured to, when it is detected that the apparatus camps on a target cell, acquire a broadcast message sent by the base station, where the broadcast message includes a selecting condition used to instruct the apparatus to perform transmission mode selection, and where the target cell belongs to the base station.

Alternatively, the broadcast message includes the selecting condition used to instruct the terminal to perform transmission mode selection. It should be noted that the target cell belongs to the base station.

The transmitter is further configured to, when the selecting condition satisfies a selecting condition of the first transmission mode, establish a wireless connection with the base station, and acquire the first communications resource allocated by the base station, and use the first transmission mode to send data.

The transmitter is further configured to, when the selecting condition satisfies a selecting condition of the second transmission mode, use the second transmission mode to send data.

The selecting condition of the first transmission mode includes any one of the following conditions:

The resource pool is not notified in the selecting condition.

The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor.

The resource pool is notified in the selecting condition, and the selecting condition includes a threshold of downlink receiving power for using the first transmission mode, the downlink receiving power of the base station is measured, and the downlink receiving power is larger than the threshold of the downlink receiving power.

The resource pool is notified in the selecting condition, and the selecting condition includes a load threshold of the resource pool, the resource pool includes at least one second communications resource, and the number of the occupied second communications resource in the resource pool exceeds the load threshold.

The selecting condition of the second transmission mode includes any one of the following conditions:

The resource pool is notified in the selecting condition, and the selecting condition includes a random seed for generating a random number and a scale factor functioned as a threshold for comparing, the random seed is used as an initial condition of a preset probability density function, the random number is generated through the probability density function, and the random number is larger than the scale factor.

The resource pool is notified in the selecting condition, and the selecting condition includes a threshold of downlink receiving power for using the first transmission mode, the downlink receiving power of the base station is measured, and the downlink receiving power is smaller than the threshold of the downlink receiving power.

The resource pool is notified in the selecting condition, and the selecting condition includes a load threshold of the resource pool, the resource pool includes at least one second communications resource, the number of the occupied second communications resource in the resource pool is smaller than the load threshold.

Persons of ordinary skill in the art can understand that all or part of the steps of the method provided in the embodiments above may be implemented by a computer program instructing relevant hardware. The program may be stored in a computer readable storage medium. When the program runs, the flow of the method specified in any embodiment above can be included. The storage medium may be a magnetic disk, an optical disk, read-only memory (ROM) or random access memory (RAM) etc.

The steps in the method of the embodiments of the present disclosure can be changed in order, combined and deleted according to actual needs.

The modules or units in the terminal of the embodiments of the present disclosure can be combined, divided and deleted according to actual needs.

The components such as a micro-controller etc. in the embodiments of the present disclosure can be realized through a general integrated circuit (such as a CPU), or through a specific integrated circuit (ASIC).

The above merely discloses preferred embodiments of the present disclosure, and does not intend to limit the scope of the claims of the present disclosure. Therefore, equivalent variations made according to the claims of the present disclosure still fall within the scope of the present disclosure.

What is claimed is:

1. A method for transmission mode conversion, comprising:

detecting, by a terminal, that a first transmission mode can be used for sending data, and using, by the terminal, the first transmission mode to send the data;

stopping using, by the terminal, the first transmission mode to send the data and using a second transmission mode to send the data after a first preset time, in response to detecting that the first transmission mode cannot be used, wherein the first preset time balances a number of terminals that send data using the second transmission mode;

detecting that the first transmission mode can be used while the terminal uses the second transmission mode to send the data; and stopping using, by the terminal, the second transmission mode to send the data, and using the first transmission mode to send the data, in response to detecting that the first transmission mode can be used while the terminal uses the second transmission mode to send the data;

wherein:

using the first transmission mode to send the data refers to the terminal sending the data through a first communications resource allocated by a base station, and using the second transmission mode to send the data refers to the terminal sending the data through a second communications resource selected in a resource pool configured by the base station, or the terminal sending the data through an inherent third communications resource.

2. The method according to claim 1, wherein the stopping using, by the terminal, the first transmission mode to send the data and using the second transmission mode to send the data after the first preset time, in response to detecting that the first transmission mode cannot be used, comprises:

in response to determining that the terminal cannot acquire the first communications resource from the base station, determining, by the terminal, that the first transmission mode cannot be used, stopping using the first transmission mode to send the data, and using the second transmission mode to send the data after the first preset time; or, in response to determining that the first communications resource acquired by the terminal from the base station cannot be used, determining, by the terminal, that the first transmission mode cannot be used, stopping using the first transmission mode to send the data, and using the second transmission mode to send the data after the first preset time.

3. The method according to claim 1, before the using, by the terminal, the second transmission mode to send the data, further comprising:

detecting, by the terminal, whether the terminal is within network coverage of the base station, in response to detecting that the first transmission mode cannot be used; and acquiring, by the terminal, the inherent third communications resource, in response to determining that the terminal is not within the network coverage of the base station;

wherein the using, by the terminal, the second transmission mode to send the data, comprises using, by the terminal, the second transmission mode to send the data through the inherent third communications resource.

4. The method according to claim 2,
wherein before detecting, by the terminal, that the first transmission mode for sending data can be used to send the data, and using, by the terminal, the first transmission mode to send the data, the method further comprising:
    establishing, by the terminal, a wireless connection with the base station;
    acquiring the first communications resource allocated by the base station; and
    using the first transmission mode to send the data through the first communications resource; and
wherein, in response to determining that the first communications resource acquired by the terminal from the base station cannot be used, determining, by the terminal, that the first transmission mode cannot be used to send the data, stopping using the first transmission mode to send the data, and using the second transmission mode to send the data after the first preset time, comprises:
    in response to detecting that the wireless connection fails, determining, by the terminal, that the first transmission mode cannot be used to send the data, stopping using the first transmission mode to send the data, and using the second transmission mode to send the data after the first preset time.

5. The method according to claim 2,
wherein the detecting, by the terminal, that the first transmission mode for sending data can be used to send the data, and using, by the terminal, the first transmission mode to send the data comprises:
    establishing, by the terminal, a wireless connection with the base station; and
    sending a scheduling request to the base station, wherein the scheduling request is used to request allocation of a cellular uplink resource; and
wherein, in response to determining that the terminal cannot acquire the first communications resource from the base station, determining, by the terminal, that the first transmission mode cannot be used to send the data, stopping using the first transmission mode to send the data, and using the second transmission mode to send the data after the first preset time, comprises:
    in response to determining that a number of transmission times of the scheduling request exceeds a preset number of times, and the base station does not allocate the cellular uplink resource, determining, by the terminal, that the first transmission mode cannot be used to send the data, stopping using the first transmission mode to send the data, and using the second transmission mode to send the data after the first preset time.

6. The method according to claim 2, further comprising:
determining that the terminal camps on a target cell and locates at an edge of the target cell, wherein the target cell belongs to the base station,
wherein the detecting, by the terminal, that the first transmission mode for sending data can be used to send the data, and using, by the terminal, the first transmission mode to send the data comprises:
    sending, by the terminal, a connection establishment request to the base station, wherein the connection establishment request is used to establish a wireless connection;
wherein, in response to determining that the terminal cannot acquire the first communications resource from the base station, determining, by the terminal, that the first transmission mode cannot be used to send the data, stopping using the first transmission mode to send the data, and using the second transmission mode to send the data after the first preset time, comprises:
    in response to determining that a number of transmission times of the connection establishment request exceeds preset number of times, and no response message sent by the base station is received, determining, by the terminal, that the first transmission mode cannot be used to send the data, stopping using the first transmission mode to send the data, and using the second transmission mode to send the data after the first preset time.

7. The method according to claim 6, wherein, the stopping using, by the terminal, the second transmission mode to send the data, and using the first transmission mode to send the data, in response to detecting that the first transmission mode can be used while the terminal uses the second transmission mode to send the data, comprises:
    continuing sending, by the terminal, the connection establishment request to the base station while the terminal uses the second transmission mode to send the data;
    after the wireless connection is established successfully, and the base station allocates the first communications resource for the terminal, determining, by the terminal, that the first transmission mode can be used to send the data; and
    stopping using, by the terminal, the second transmission mode to send the data, and using the first transmission mode to send the data.

8. An apparatus for transmission mode conversion, comprising:
    a processor, configured to detect whether a first transmission mode for sending data can be used to send the data; and
    a transmitter, configured to:
        use the first transmission mode to send the data in response to the processor detecting that the first transmission mode can be used to send the data;
        stop using the first transmission mode to send the data and use a second transmission mode to send the data after a first preset time, in response to detecting that the first transmission mode cannot be used, wherein the first preset time balances a number of terminals that send data using the second transmission mode;
        in response to the processor detecting that the first transmission mode can be used to send the data while the second transmission mode is used to send the data, stop using the second transmission mode to send the data, and use the first transmission mode to send the data;
    wherein the first transmission mode refers to that the apparatus sends the data through a first communications resource allocated by the base station; and
    wherein the second transmission mode refers to that the apparatus sends the data through a second communications resource selected in a resource pool configured by the base station, or that the apparatus sends the data through an inherent third communications resource.

9. The apparatus according to claim 8, wherein:
in response to the processor determining that the first communications resource cannot be acquired from the base station, the processor determines that the first transmission mode cannot be used and causes the transmitter to stop using the first transmission mode to send the data, and the transmitter uses the second transmission mode to send the data after the first preset time.

10. The apparatus according to claim 8, wherein:
the processor is further configured to, in response to detecting that the first transmission mode cannot be used to send the data, detect whether the apparatus is within network coverage of the base station;
the processor is further configured to, in response to determining that the apparatus is not within the network coverage of the base station, acquire the inherent third communications resource of the apparatus; and
the transmitter is configured to use the second transmission mode to send the data through the third communications resource.

11. The apparatus according to claim 9, wherein:
the processor is further configured to establish a wireless connection with the base station, acquire the first communications resource allocated by the base station, and the transmitter is configured to use the first transmission mode to send the data through the first communications resource; and
wherein:
the processor is configured to, when it is detected that the wireless connection fails, determine that the first transmission mode cannot be used to send the data, and the transmitter is configured to stop using the first transmission mode to send the data and use the second transmission mode to send the data after the first preset time.

12. The apparatus according to claim 9, wherein:
the processor is configured to establish a wireless connection with the base station, and the transmitter is configured to send a scheduling request to the base station, wherein the scheduling request is used to request allocation of a cellular uplink resource; and
the processor is configured to, when a number of transmission times of the scheduling request exceeds a preset number of times and the base station does not allocate the cellular uplink resource, determine that the first transmission mode cannot be used, and stop using the first transmission mode to send the data, and the transmitter is configured to use the second transmission mode to send the data after a first preset time.

13. The apparatus according to claim 12, wherein:
the processor is configured to, while the apparatus uses the second transmission mode to send data, detect whether the base station allocates the cellular uplink resource for the apparatus through reconfiguration; and
the transmitter is configured to, in response to the processor detecting that the base station allocates the cellular uplink resource for the apparatus through the reconfiguration, stop using the second transmission mode to send the data, and use the first transmission mode to send the data.

14. The apparatus according to claim 9, wherein:
the transmitter is configured to continue sending the wireless connection request to the base station while the apparatus uses the second transmission mode to send the data;
the processor is configured to, after the wireless connection is established successfully and the base station allocates the first communications resource for the, determine that the first transmission mode can be used to send the data; and
the transmitter is configured to stop using the second transmission mode to send the data and use the first transmission mode to send the data.

15. The apparatus according to claim 8, wherein:
the processor is configured to perform cell selection;
the processor is configured to, in response to detecting that the apparatus camps on a target cell, acquire a broadcast message sent by the base station, wherein the broadcast message comprises a selecting condition used to instruct the apparatus to perform transmission mode selection, and wherein the target cell belongs to the base station;
the processor is configured to, in response to determining that the selecting condition satisfies a selecting condition of the first transmission mode, establish a wireless connection with the base station, and acquire the first communications resource allocated by the base station; and
the transmitter is configured to use the first transmission mode to send the data.

16. The apparatus according to claim 8, wherein:
in response to the processor determining that the first communications resource acquired from the base station cannot be used, the processor determines that the first transmission mode cannot be used and causes the transmitter to stop using the first transmission mode to send the data, and the transmitter uses the second transmission mode to send the data after the first preset time.

* * * * *